(12) United States Patent
Buda et al.

(10) Patent No.: US 8,083,286 B2
(45) Date of Patent: Dec. 27, 2011

(54) SLEEPER CAB ASSEMBLY FOR VEHICLE

(75) Inventors: Brian Buda, Brighton, MI (US); Robert Moore, Salisbury, NC (US); Jeffrey Robbins, Ann Arbor, MI (US); John Muglia, Shelby Township, MI (US); Bradley R. Hamlin, Canton, MI (US); Kenneth R. Schmidt, Plymouth, MI (US); Michael Ray Elliott, Wyandotte, MI (US); Robert Cleland, Macomb, MI (US)

(73) Assignee: Magna International Inc., Aurora (CA)

( * ) Notice: Subject to any disclaimer, the term of this patent is extended or adjusted under 35 U.S.C. 154(b) by 274 days.

(21) Appl. No.: 12/408,563

(22) Filed: Mar. 20, 2009

(65) Prior Publication Data
US 2009/0256392 A1 Oct. 15, 2009

Related U.S. Application Data

(60) Provisional application No. 61/064,721, filed on Mar. 21, 2008, provisional application No. 61/071,304, filed on Apr. 21, 2008, provisional application No. 61/129,862, filed on Jul. 24, 2008, provisional application No. 61/136,947, filed on Oct. 16, 2008.

(51) Int. Cl.
*B60N 99/00* (2006.01)
(52) U.S. Cl. .............................. 296/190.11; 296/190.08
(58) Field of Classification Search ............ 296/190.08, 296/190.11
See application file for complete search history.

(56) References Cited

U.S. PATENT DOCUMENTS

| | | | |
|---|---|---|---|
| 5,083,834 A * | 1/1992 | Moffatt et al. ............. | 296/26.02 |
| 5,735,568 A * | 4/1998 | Arnold ..................... | 296/190.02 |
| 6,367,391 B1 * | 4/2002 | Thoman et al. .............. | 105/404 |
| 2001/0003623 A1* | 6/2001 | Padmanabhan et al. ... | 428/479.6 |
| 2006/0208462 A1* | 9/2006 | Spence ......................... | 280/656 |

\* cited by examiner

*Primary Examiner* — Lori Lyjak
(74) *Attorney, Agent, or Firm* — Warn Partners, P.C.; Marc Luddy

(57) ABSTRACT

A sleeper cab assembly for a vehicle includes a frame configured to provide a support structure for at least a portion of the sleeper cab assembly. The frame includes a plurality of frame members coupled together. Each of the frame members are formed of a reinforced polymeric material.

26 Claims, 25 Drawing Sheets

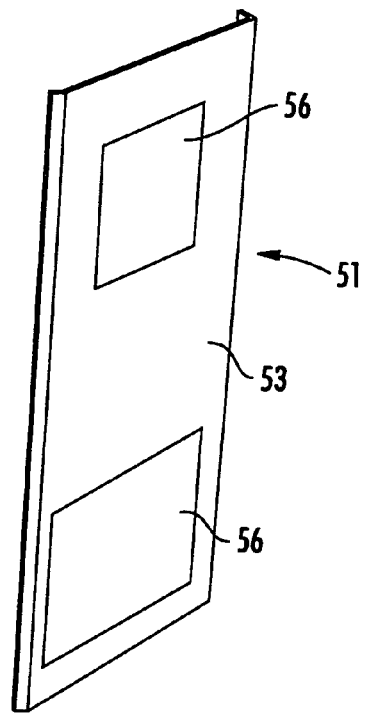 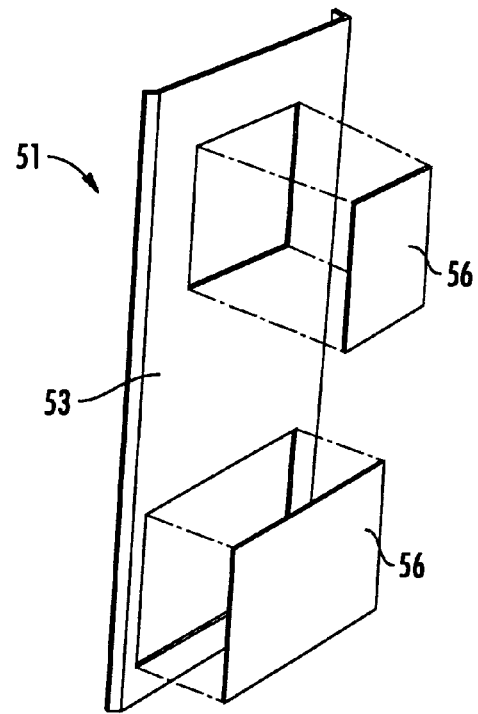
FIG. 37  FIG. 38
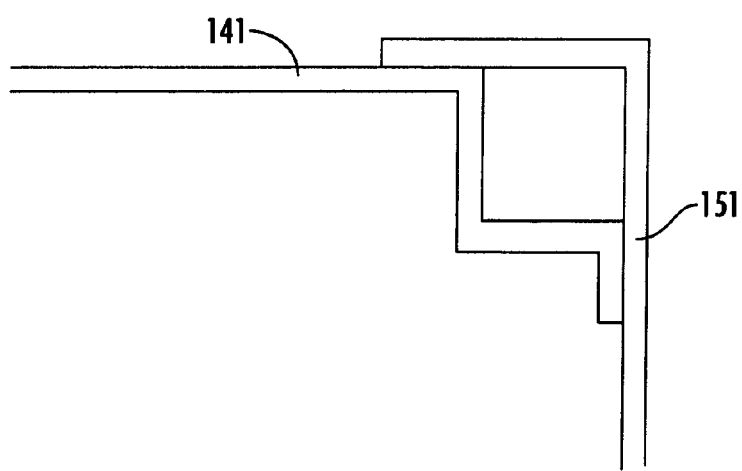
FIG. 39

SLEEPER CAB ASSEMBLY FOR VEHICLE

CROSS-REFERENCE TO RELATED PATENT APPLICATIONS

This application claims the benefit of and priority to the following U.S. provisional patent applications, the disclosures of which are incorporated herein by reference in their entireties: U.S. Patent Application No. 61/064,721, filed Mar. 21, 2008; U.S. Patent Application No. 61/071,304, filed Apr. 21, 2008; U.S. Patent Application No. 61/129,862, filed Jul. 24, 2008; and U.S. Patent Application No. 61/136,947, filed Oct. 16, 2008.

BACKGROUND

The present application relates generally to the field of cab construction for use on vehicles such as heavy duty trucks (e.g., "class 8" trucks). More specifically, the present application relates to a sleeper cab or sleeper box for use with such vehicles that is relatively simple to manufacture and that may be tailored to accommodate different vehicle requirements and parameters (e.g., length, width, or height).

It would be advantageous to provide a modular sleeper cab assembly for use within vehicles, such as class 8 trucks. It would also be advantageous to provide a sleeper cab assembly that is relatively simple and inexpensive to manufacture. It would further be advantageous to provide a modular sleeper cab assembly that may be tailored to particular dimensions for a desired application without requiring new manufacturing equipment for each application configuration. It would be desirable to provide a sleeper cab assembly that includes any one or more of these or other advantageous features as may be apparent from the description provided herein.

SUMMARY

One embodiment of the invention relates to a sleeper cab assembly for a vehicle that includes a frame configured to provide a support structure for at least a portion of the sleeper cab assembly. The frame includes a plurality of frame members coupled together. Each of the frame members are formed of a reinforced polymeric material.

Another embodiment of the invention relates to a sleeper cab assembly for a vehicle that includes a structure formed from a plurality of fiber reinforced polymeric members joined together and configured to define a sleeper box. The sleeper cab assembly also includes a floor comprising a plurality of floor panels coupled together, the floor panels formed from a fiber reinforced polymeric material. The sleeper cab assembly further includes a plurality of panels coupled to the structure.

Another embodiment of the invention relates to a vehicle that includes a sleeper cab comprising a frame and a floor assembly coupled to the frame. At least one of the frame and the floor assembly are formed at least in part from a reinforced polymeric material.

BRIEF DESCRIPTION OF THE DRAWINGS

FIG. 37 is a perspective view of another exemplary embodiment of a side panel within a modular sleeper cab.

FIG. 38 is an exploded perspective view of the side panel shown in FIG. 37.

FIG. 39 is a cross-sectional view showing the corner configuration formed by coupling a back panel to a side panel.

DETAILED DESCRIPTION

Figure 1:
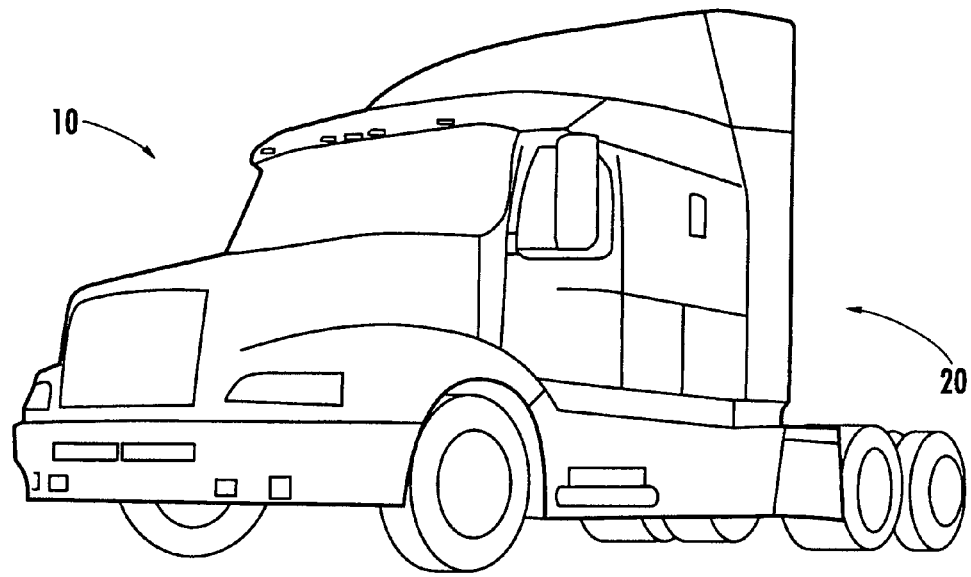
FIG. 1 is a perspective view of a vehicle according to an exemplary embodiment.
Figure 2:
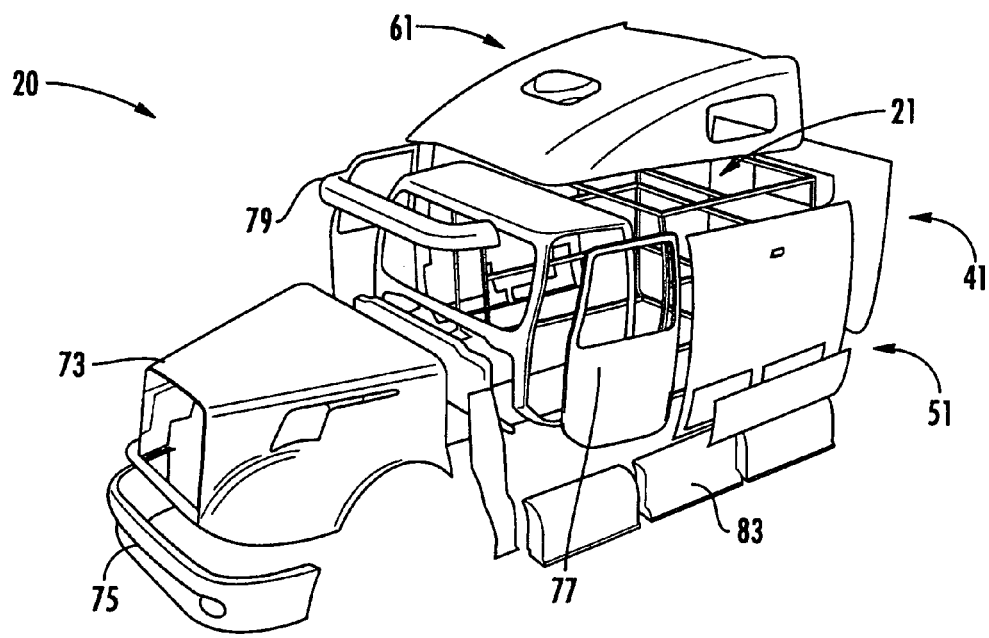
FIG. 2 is a partially exploded perspective view of an exemplary embodiment of a modular sleeper cab assembly and other vehicle components, for use within a vehicle, such as the vehicle shown in FIG. 1.
Figure 13:
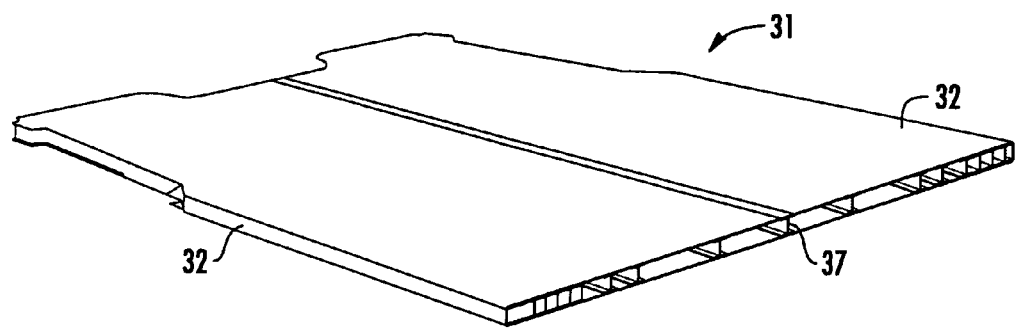
FIG. 13 is a perspective view of an exemplary embodiment of a modular floor structure for use within a modular sleeper cab assembly such as the modular sleeper cab assembly shown in FIG. 2.
Figure 14:
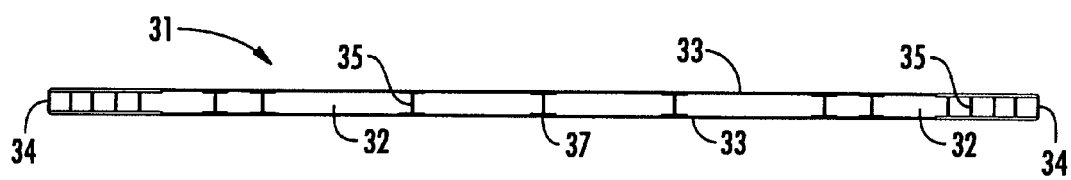
FIG. 14 is a front end view of the modular floor structure shown in FIG. 13.

Referring to FIG. 2, an exemplary embodiment of a modular sleeper cab assembly 20 is illustrated, and includes a frame structure 21, a floor assembly 31 (an example of which is shown in FIG. 13), a back assembly 41, at least one side assembly 51, and a roof assembly 61. The modular sleeper cab assembly 20 may further include a hood panel 73, a bumper panel 75, a door panel 77, a windshield panel 79 (e.g., a visor), and a step 83. The rear portion of the sleeper cab assembly 20 is commonly referred to as a sleeper box, while the forward portion of the sleeper cab assembly 20 is a passenger compartment, and includes a driver's seat and passenger seat (not shown). It should be noted that the disclosed constructions of modular sleeper cab assemblies may additionally be used for constructing modular "day cab" assemblies, which are heavy duty trucks without the (rear) sleeper portion. It should also be noted that although FIG. 2 illustrates and the present application describes the use of modular sleeper cab assembly 20 with a heavy duty truck 10, such as a class 8 truck shown in FIG. 1, structures similar to the sleeper cab assembly 20 may be used with other types of vehicles as well (e.g., buses, passenger cars, class 6 trucks, other utility trucks or vans, recreational vehicles, aerospace applications, or marine vehicles such as boats and the like).

Figure 3:
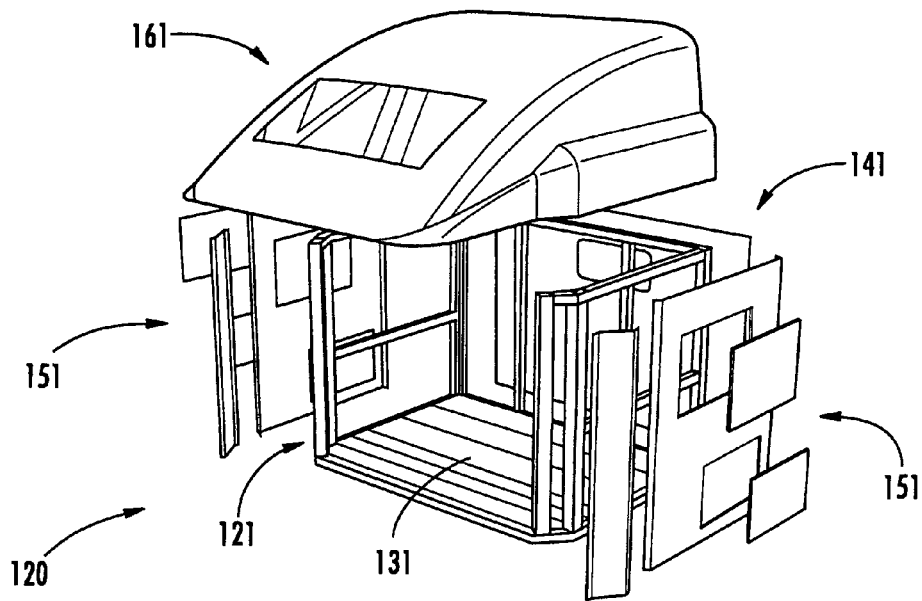
FIG. 3 is a partially exploded perspective view of a modular sleeper cab assembly according to another exemplary embodiment.
Figure 4:
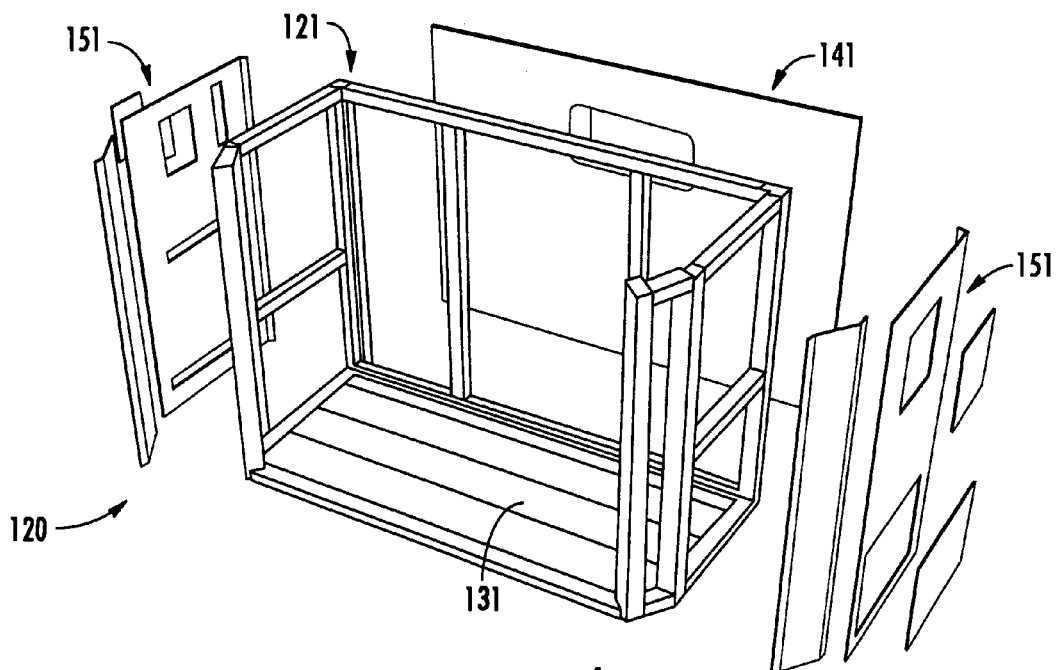
FIG. 4 is a partially exploded perspective view of the modular sleeper cab assembly shown in FIG. 3 with the roof assembly removed for clarity.

Referring to FIGS. 3 and 4, another exemplary embodiment of a modular sleeper cab assembly 120 is illustrated, and includes a frame structure 121, a floor assembly 131, a back assembly 141, two side assemblies 151, and a roof assembly 161. According to an exemplary embodiment, the sleeper cab assembly 120 may be constructed by coupling the frame structure 121 to the floor assembly 131, then the side assemblies 151, back assembly 141, and roof assembly 161 may be coupled to the frame structure 121. The assembly in FIG. 3 illustrates only the sleeper box portion of the sleeper cab assembly and an associated roof assembly. It should be understood that the sleeper box portion shown in FIG. 3 may be used in conjunction with a separate passenger compartment to form a complete sleeper cab assembly according to other exemplary embodiments.

Figure 5:
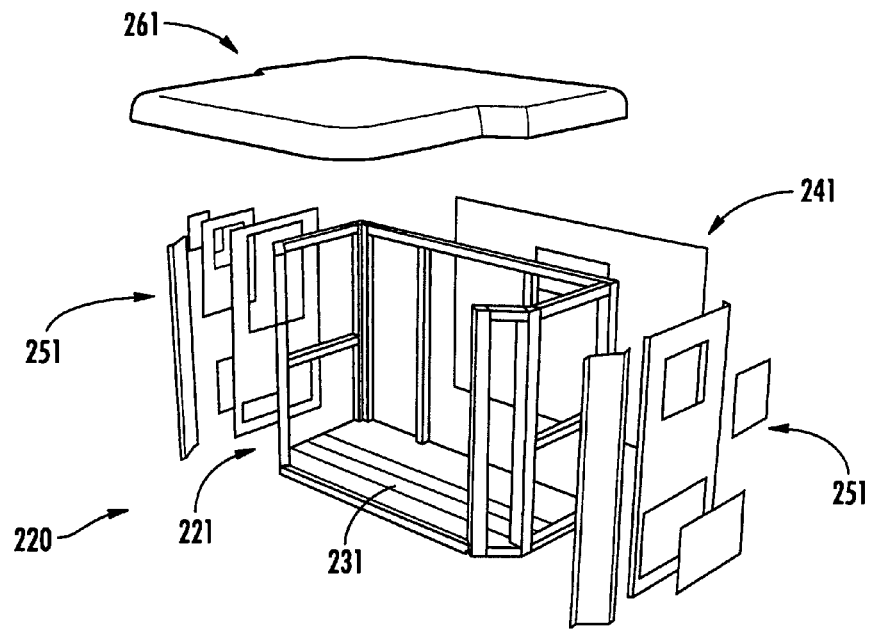
FIG. 5 is a partially exploded perspective view of a modular sleeper cab assembly according to another exemplary embodiment.
Figure 6:
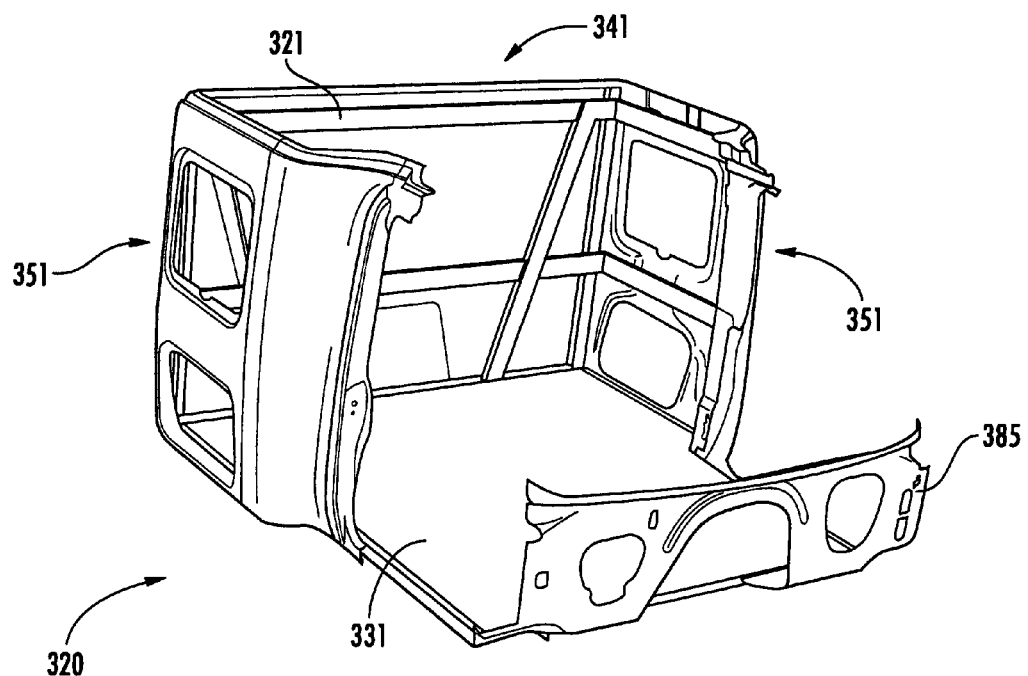
FIG. 6 is a perspective view of a partial embodiment of a modular sleeper cab assembly according to another exemplary embodiment.

Referring to FIGS. 5 and 6, other exemplary embodiments of modular sleeper cab assemblies are illustrated. Modular sleeper cab assembly 220, shown in FIG. 5, includes a frame structure 221, a floor assembly 231, a back assembly 241, two side assemblies 251, and a roof assembly 261. FIG. 5 illustrates only the sleeper box portion of a complete sleeper cab assembly, similar to that shown in FIG. 2.

Modular sleeper cab assembly 320, shown in FIG. 6, includes a frame structure 321, a back assembly 341, at least one side assembly 351, a floor assembly 331, and a front panel 385. The modular sleeper cab 320 may further include a roof assembly door panels, and other components (not shown). The rear portion of the assembly 320 may serve as a sleeper box, while the forward portion adjacent front panel 385 may serve as a passenger compartment in the completed sleeper cab assembly 320.

It should be understood to those reviewing the present disclosure that additional components may be secured to the various components of the assemblies shown in FIGS. 2-6, including, for example, seats, storage compartments, beds, dashboard assemblies, doors, engine compartment components, and a variety of other components that would be included in the interior of a sleeper cab assembly as are well known in the art.

The various components of the assemblies shown in FIGS. 2-6 may be coupled together using any of a variety of suitable methods, such as mechanical fastening methods (e.g., rivets or screws), chemical fastening (e.g., adhesives), other fastening methods (e.g., ultrasonic, laser, or hot gas welding), or any combination of fastening methods.

Figure 7:
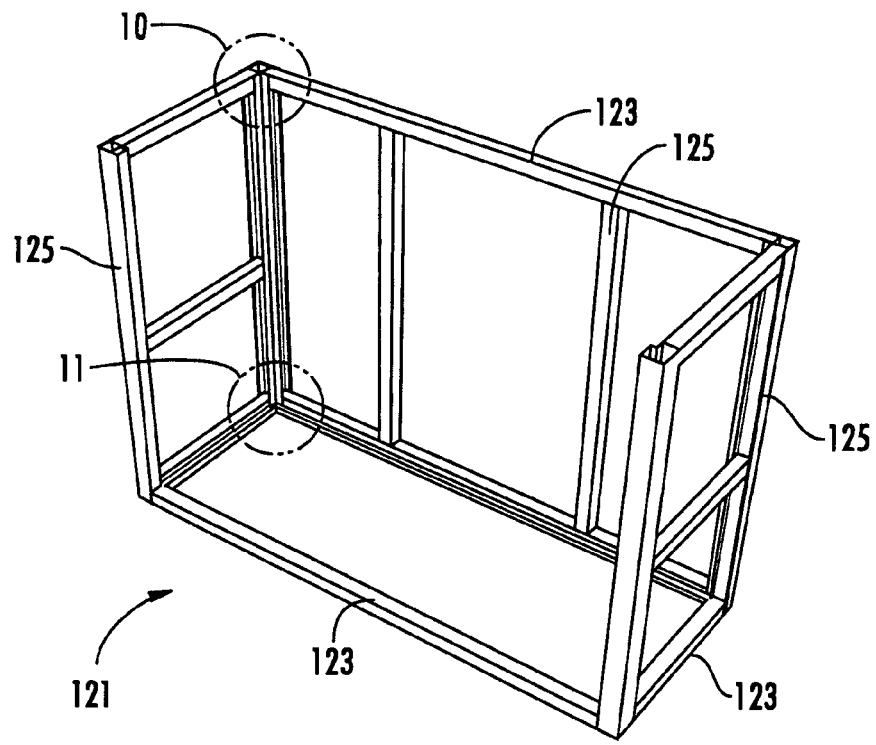
FIG. 7 is a perspective view of another exemplary embodiment of a modular frame structure for use with a modular sleeper cab assembly.
Figure 8:
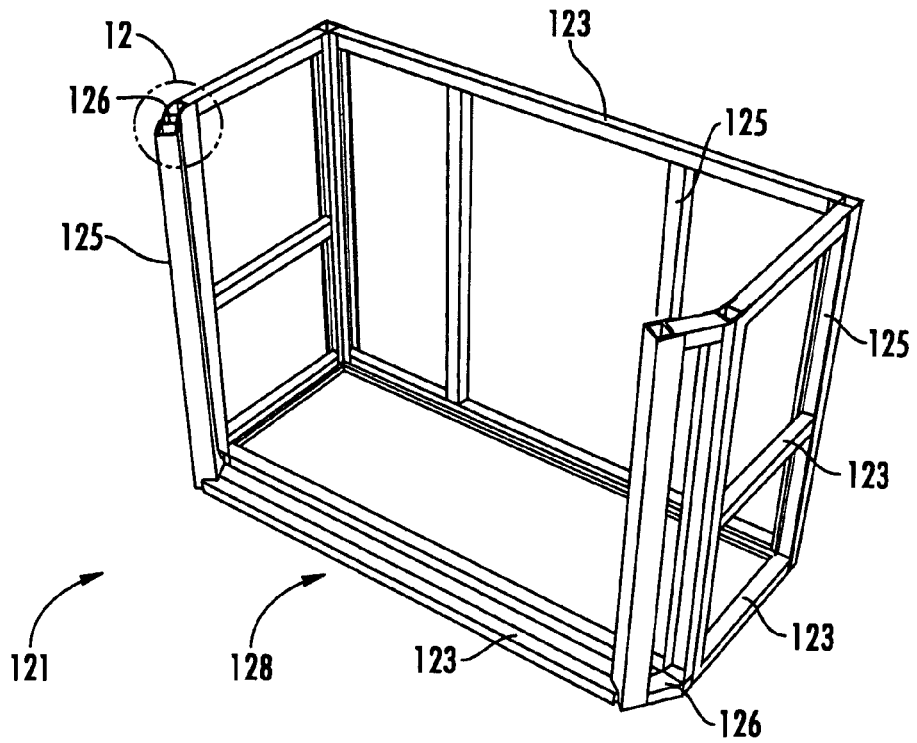
FIG. 8 is a perspective view of an exemplary embodiment of a modular frame structure for use with a modular sleeper cab assembly, such as the modular sleeper cab assembly shown in FIG. 5.

FIGS. 7 and 8 illustrate two exemplary embodiments of frame structures for use with sleeper cab assemblies in accordance with the present disclosure. Frame structure 121 includes a plurality of horizontal frame members 123 and a plurality of vertical frame members 125 that may be coupled together using any suitable fastener type. According to an exemplary embodiment, the frame structure 121 has a substantially hexahedral shape, having multiple sides, each comprising of at least two horizontal frame members 123 and at least two vertical frame members 125 assembled into a substantially rectangular frame. Additional frame members may be added horizontally, vertically, or diagonally to provide improved strength to the frame structure 121, as required. These additional frame members may be coupled to the frame structure using any suitable fastener.

Figure 10:
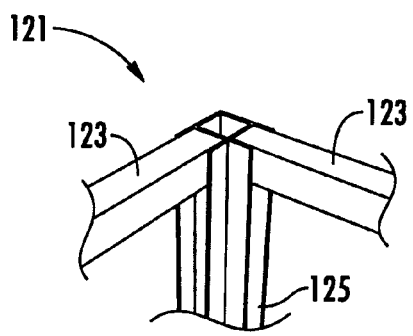
FIG. 10 is a perspective view of an exemplary embodiment of a corner assembly for use within a modular frame structure such as the frame structure shown in FIG. 7.
Figure 11:
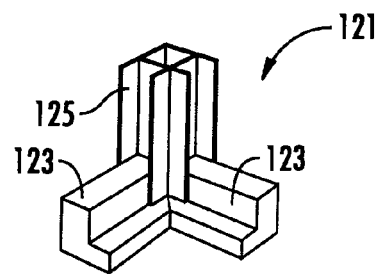
FIG. 11 is a perspective view of another exemplary embodiment of a corner assembly for use within a modular frame structure such as the frame structure shown in FIG. 7.

According to one exemplary embodiment shown in FIGS. 10-11, the vertical frame members 125 have a cross-section that includes a box-section with two adjacent C-shaped portions that are arranged substantially perpendicular to each other. The base of each C-section is a shared wall with the box section, and the legs of each C-section extend away from the box section parallel to each other and perpendicular to the legs of the adjacent C-section. The box section provides improved strength, and the C-shaped portions may receive the horizontal frame members 123 for coupling.

The horizontal frame members 123 used along the top of the frame structure 121 have box shaped cross-sections that fit between the legs of the C-shaped portion of the vertical frame members 125. Thus, portions of the horizontal frame members 123 along the top of the frame structure 121 may be received within the C-shaped portions of the vertical frame members.

The horizontal frame members 123 used along the bottom of the frame structure 121 may have a similar or different cross-section as those used along the top of the frame structure 121. According to an exemplary embodiment, the bottom horizontal frame members have an L-shaped cross-section with legs that extend vertically and horizontally. The vertically extending leg may be configured to fit between the legs of the C-shaped portion of the vertical frame members 125, and the horizontal extending leg may act as a base, having the end of the vertical frame member 125 coupled proximate to the base. Additionally, the horizontal extending leg of the bottom horizontal frame members 123 may be used to support the floor assembly 31, and be load bearing.

Of course, the frame members 123, 125 shown in FIGS. 10-11 are only one possible embodiment, and those reviewing the present disclosure will appreciate that a variety of other cross-sections may be used for the various frame members. Any desired cross-sectional configuration may be used for the horizontal and vertical frame members, including a C-shape, box section, or any other useful configuration. It should be noted that the hollow construction of the various frame structure members may serve additional purpose, for example, these members may serve as HVAC carrying members to transport heated or cooled air into the sleeper cab assembly, or may also serve as routing and protection of wiring harnesses.

Some vehicles have a cab portion that is narrower than the sleeper box portion (see, e.g., the assembly shown in FIG. 6, where the forward portion of the assembly has a narrower width than the rear sleeper box portion). In such cases, the frame structure for a sleeper cab assembly may include frame members that are configured to provide a transition region from the wider rear portion to the narrower front portion. As shown in FIG. 8 according to an exemplary embodiment, a frame structure 121 may include a transition portion 128 that includes a plurality of horizontal frame members 123 and a plurality of vertical frame members 125 that are coupled together into substantially rectangular portions using any suitable fasteners. Transition members 126 may be provided to couple the transition portion 128 to the rest of the frame structure. The transition portion 128 may include additional frame members to provide improved strength. The transition portion 128 may have dimensions (e.g., transition angle, transition width, transition length) which may be varied to accommodate different customer applications.

Figure 12:
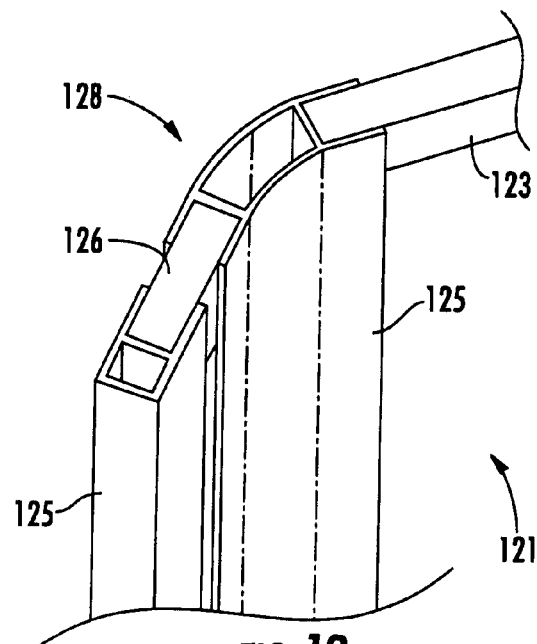
FIG. 12 is a top-perspective view of the corner configuration for a transition portion of the frame structure shown in FIG. 8.

According to an exemplary embodiment, the vertical frame members 125 used to form the transition portion 128, as detailed in FIG. 12, may have a closed cross-section having multiple surfaces with two C-shaped portions that are offset at an angle (i.e., transition angle) to each other. The base of each C-section is a shared wall with the closed section, and the legs of each C-section extend away from the box section parallel to each other. The closed section provides improved strength, and the C-shaped portions may receive the horizontal frame members 123 for coupling. The horizontal frame members 123 used along the top of the frame structure 121 may have box shaped cross-sections that fit between the legs of the C-shaped portion of the vertical frame members 125.

Figure 9:
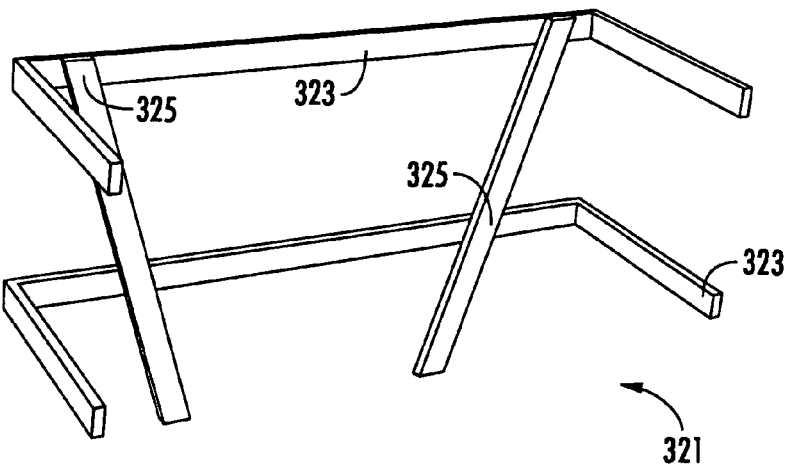
FIG. 9 is a perspective view of another exemplary embodiment of a modular frame structure for use with a modular sleeper cab assembly such as the modular sleeper cab shown in FIG. 6.

Referring to FIG. 9, a frame structure 321 is illustrated according to another exemplary embodiment (e.g., for use with an assembly such as that shown in FIG. 6), and includes a plurality of generally horizontal frame members 323 coupled to a plurality of generally vertical frame members 325. The generally horizontal frame members 323 have a substantially C-shaped configuration, and are coupled to the generally vertical frame members 325 to form the frame structure 321. The horizontal frame members 323 may have closed cross-sections, such as a box or rectangle, to resist torsion and bending. The generally vertical frame members 325 may also have closed cross-sections, such as a box or rectangle, and may be configured to run diagonally or transverse to the horizontal frame members 323. The members 323 and 325 may be coupled together using any suitable fasteners.

According to an exemplary embodiment, the frame members shown in the various exemplary embodiments herein may be formed from a reinforced polymeric material (e.g., a pultruded composite material having a resin matrix with reinforcements (e.g., chopped fibers, fiber rovings, fiber mats, etc.) provided within the matrix. The various frame members may be formed in a continuous process and cut to a desired length for use within the frame assembly. In this manner, relatively low-cost tooling may be used to efficiently form the various frame members without the need to have separate tooling for every different application. One advantageous feature of such a frame structure is that the frame structure may be varied or tailored to form frame structures of varied geometries to meet customer demands without the need to design or purchase additional tooling. Customer requirements and changes can be met more quickly and efficiently than would otherwise be possible.

As will be described in further detail below, other components of the sleeper cab assembly may also be formed of reinforced polymeric materials. The use of reinforced polymeric components allows for significant weight savings in the construction of the sleeper cab assembly while still retaining strength sufficient for the application. The decreased weight should also result in improved fuel economy for vehicles using the sleeper cab assemblies described herein.

Figure 15:
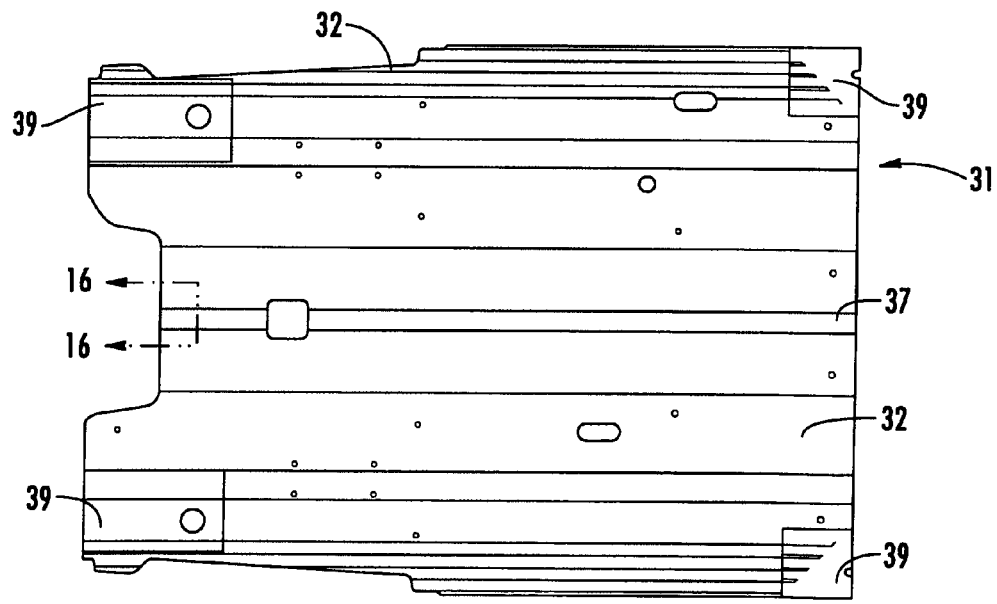
FIG. 15 is a bottom view of the floor structure shown in FIG. 13.
Figure 16:
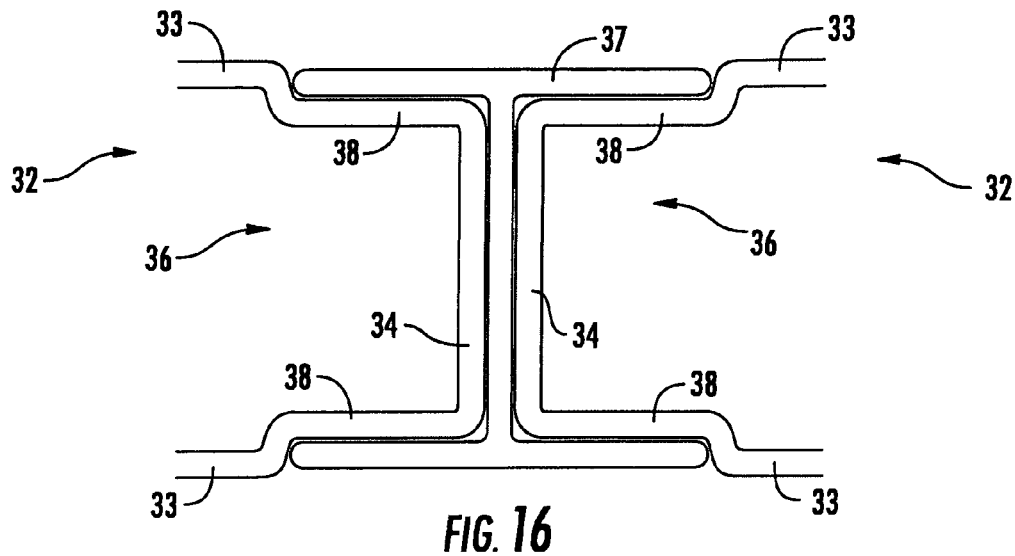
FIG. 16 is a partial section view of the floor structure shown in FIG. 15 taken along line 16-16.
Figure 17:
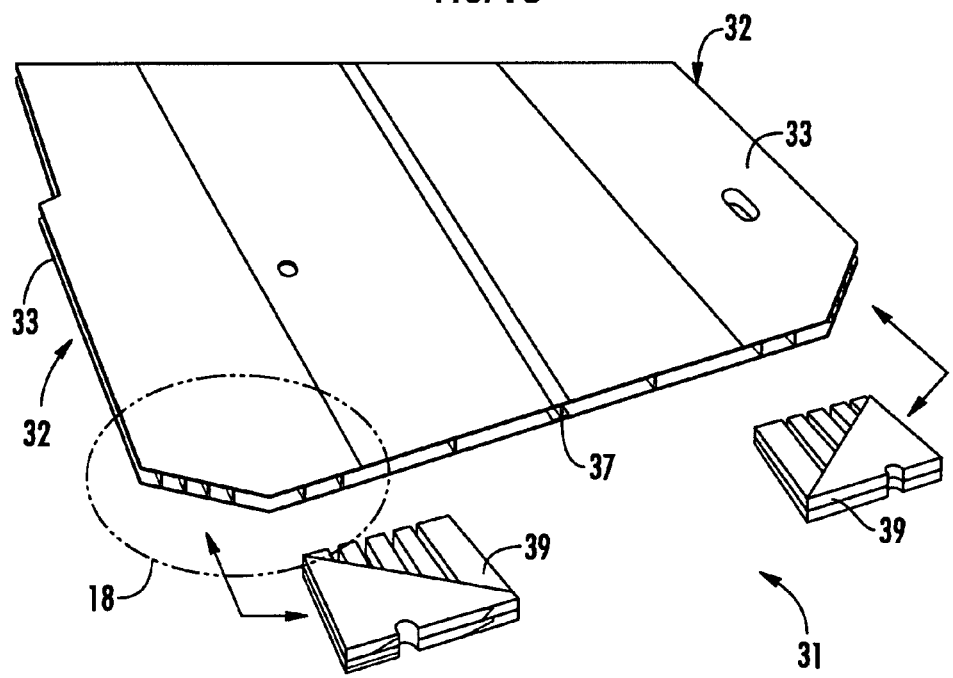
FIG. 17 is a partial exploded view of a floor structure similar to that shown in FIG. 15 illustrating corner supports used with such floor structure.
Figure 18:
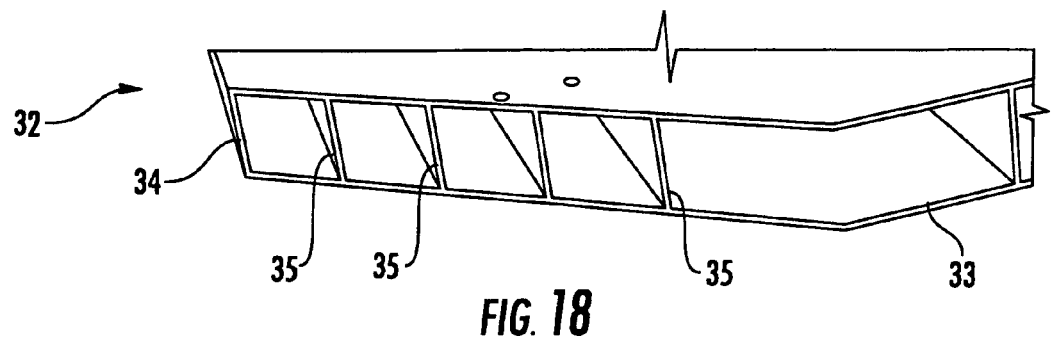
FIG. 18 is a detail view of section 18 shown in FIG. 20.
Figure 19:
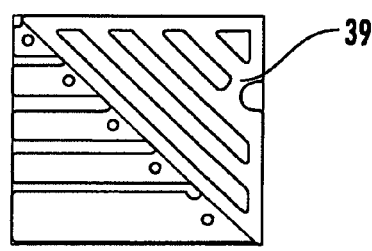
FIG. 19 is a top view of an exemplary embodiment of a corner support for use with a modular floor structure such as the floor structure shown in FIG. 15.
Figure 20:
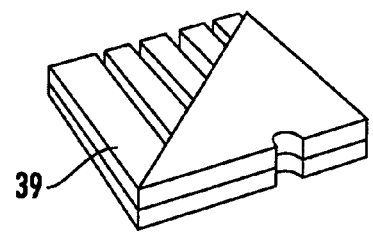
FIG. 20 is a perspective view of the corner support shown in FIG. 19.

Referring to FIGS. 13-20, an exemplary embodiment of a floor assembly 31 is illustrated, and includes two floor panels 32 coupled together with a coupling member such as a beam 37 (shown in FIG. 16 as having an I-beam configuration, although according to other exemplary embodiments, the coupling member may have other configurations, such as a member that includes projections that couple the floor panels together by being inserted into a portion of the floor panels (e.g., a generally "T" or cross-shaped member that includes two extensions that extends into channels formed in the panels)). Corner supports 39 are also provided at the corners of the floor assembly 31 to provide enhanced strength and rigidity for the floor assembly 31. Corner supports may provide improved dynamic strength by absorbing energy generated by a dynamic event (e.g., vehicle impact with obstacle or other vehicle, or jack-knife event), whereby they are configured to crumple as forces are imparted onto them. This configuration of corner support provides for a quick and less expensive repair for many low energy level collisions, as the floor structure may be left relatively undamaged, requiring only replacement of the corner supports. Corner supports may also provide improved static strength, by supporting high load areas, such as where the floor assembly is coupled to the frame structure. Corner supports may also provide both improved dynamic and static strength, for example they may reinforce the floor assembly local to where a seat assembly is coupled, and provide for improved vertical static loading of the seat and seat occupant, and may provide dynamic strength during an impact event, whereby the occupant may impart a force from a vehicle deceleration (or acceleration) into the seat and through the floor assembly.

According to an exemplary embodiment, each of the floor panels 32 include two generally parallel horizontal surfaces 33 and two end surfaces or end walls 34 that extend substantially perpendicularly between the horizontal surfaces 33. A plurality of ribs 35 are provided within the generally hollow interior of the floor panels 32 and extend between the horizontal surfaces 33 to provide enhanced support for loads that may be placed on the floor assembly 31 during use. The ribs 35 may be spaced at different or similar widths as required to meet the loading of the specific application. As shown in FIG. 13, the ribs 35 extend between a front and rear portion of the floor assembly, although according to other exemplary embodiments, the ribs may extend across the width of the floor assembly. It should be noted that the hollow portion of the floor panels may be filled with a structural foam, for example, a sprayed structural foam, to improve strength to the entire floor assembly or to local portions only.

As best shown in FIG. 16, ends 36 of the floor panels 32 are configured to be received within the beam 37 (e.g., to nest within a portion of the beam 37) to couple the floor panels 32 together. According to an exemplary embodiment, the ends 36 to be received within the beam 37 have a reduced cross-sectional area so that the top and bottom of the beam 37 may be generally flush with the surfaces 33 of the floor panels 32 when the floor assembly 31 is assembled. For example, the end wall 34 is joined to two members 38 (e.g., walls, extensions, etc.) that extend generally perpendicularly from the end wall 34 and are spaced apart by a distance that is less than the distance between the generally parallel horizontal surfaces 33 of the floor panel 32. One floor panel 32 engages each side of the beam 37 to couple the floor panels together.

This configuration allows for relatively simple coupling of the floor panels 32 to the beam 37, which can be done through mechanical fastening methods (e.g., rivets or screws), chemical fastening (e.g., adhesives), other fastening methods (e.g., ultrasonic or hot gas welding), or any combination of fastening methods.

The floor assembly 31 may also include corner supports 39, as shown, for example, in FIG. 15. The corner supports 39 may be inserted within an exposed end of the floor panel 32, and may be made from a polymeric material such as a structural foam or another suitable material. According to an exemplary embodiment, the corner supports 39 are provided as a foam block made from expanded polypropylene or other useful material, which is light weight and offers structural support. According to other embodiments, corner support 39 may be made from other structural materials and may be coupled to the floor panel 32 by other coupling devices.

This embodiment shows the two floor panels 32 as symmetrically opposite, but according to other embodiments, the two floor panels 32 need not be symmetrically opposite. Also according to other embodiments, floor assembly 31 may be made with more than two floor panels 32, having each adjacent pair of floor panels 32 being coupled with an I-support beam 37. Other embodiments of a floor assembly may include supports, similar to corner supports 39, positioned in locations other than the corner. For example, supports can be used to structurally support high load areas, that may vary depending on different customer requirements, and supports may be used in conjunction with other structural improvements (e.g., metal or metal alloy reinforcing members, high or low density structural spray foam, or combinations thereof).

The floor panels 32 may be made of a reinforced polymeric material that may be formed, for example, using a pultrusion process. Such a configuration allows for a relatively lightweight (e.g., as compared to floor assemblies made of wood, sheet steel, or other materials) and strong construction for the floor assembly.

It should also be noted that although the floor panels 32 are illustrated as being generally hollow, according to other exemplary embodiments, a foam material may be sprayed or dispensed into the hollow panel to provide enhanced structural strength for the panel while still maintaining the relatively light weight of the panel. The foam may fill the entire open volume of floor panel 32, or may fill only specific portions that are subject to high loading.

Figure 21:
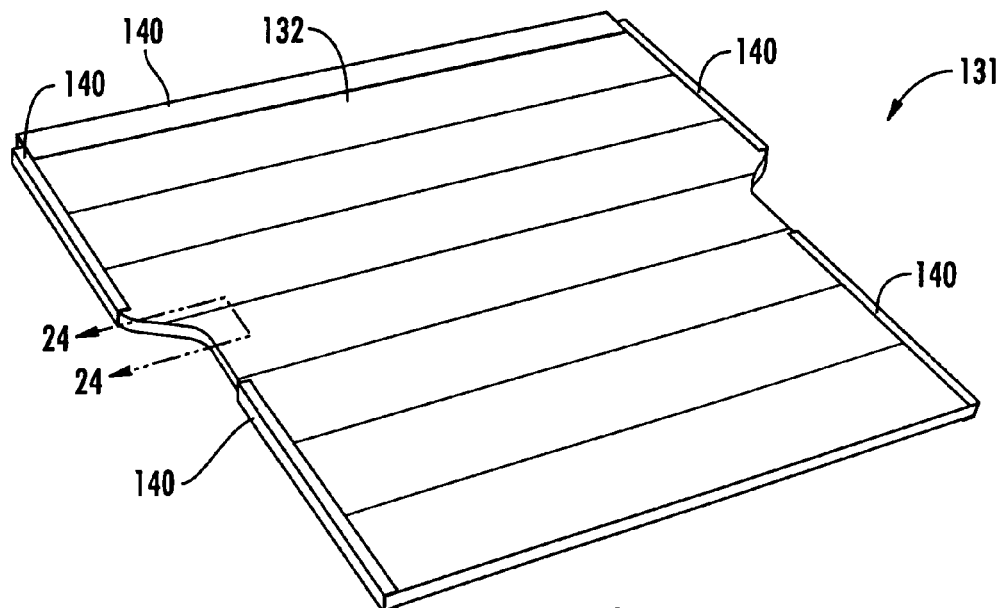
FIG. 21 is a perspective view of another exemplary embodiment of a modular floor structure for use with a modular sleeper cab assembly such as the modular sleeper cab assembly shown in FIG. 3.
Figure 22:
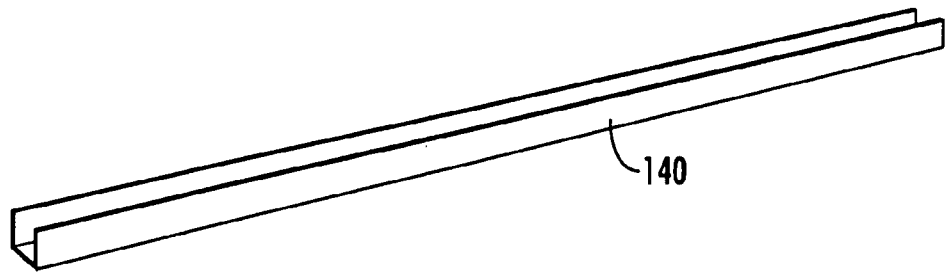
FIG. 22 is a perspective view of an exemplary embodiment of a support beam for use with a floor structure such as the floor structure shown in FIG. 21.
Figure 23:
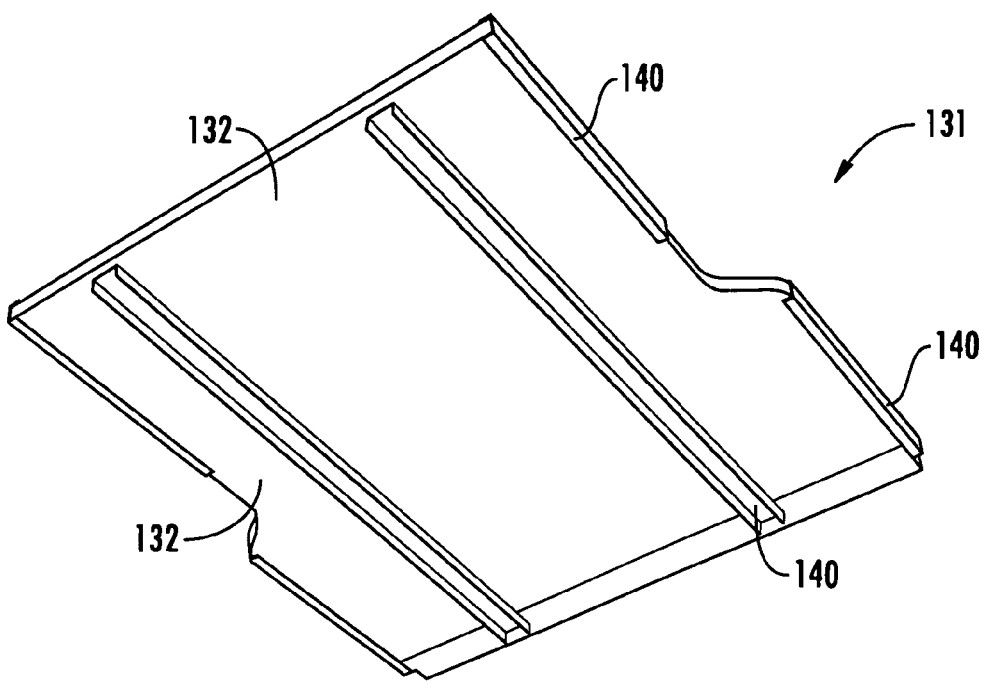
FIG. 23 is a bottom perspective view of the modular floor structure of FIG. 21, illustrating the use of support beams such as the support beam shown in FIG. 22.

Referring to FIGS. 21-23, another exemplary embodiment of a floor assembly 131 is illustrated, and includes a plurality of generally hollow floor panels 132 (although such panels may be partially or completely filled with a foam as described above with respect to the embodiments shown in FIGS. 13-20) and a plurality of support beams 140 intended to provide enhanced structural strength for the floor assembly 131.

The floor panels 132 may be made having varying length, width, and cross-section. The floor assembly 131 shown includes eight floor panels 132 having varying lengths and widths, but other embodiments may contain any number of floor panels 132 having any configuration of lengths and widths as may be desired. Typically, the floor assembly 131 are made with floor panels 132 having the same thickness or height, even if the length and width may vary from panel to panel.

Support beams 140 may be made having varying length, width, and cross-section, and according to the exemplary embodiment shown in FIG. 22 may have a C-shaped cross-section. One configuration allows the C shaped support beam 140 to fit over the floor panels 132, so that support beam 140 acts like a cap to the edge of one or more floor panels 132. Another configuration uses the support beam 140 to be positioned below the floor panels 132 and to run transverse to the longer dimension of each floor panel 132, to provide structural support for increased loading capacity. The floor panels 132 may be coupled to other floor panels 132 and to support beam 140, forming a floor assembly 131.

Figure 24:
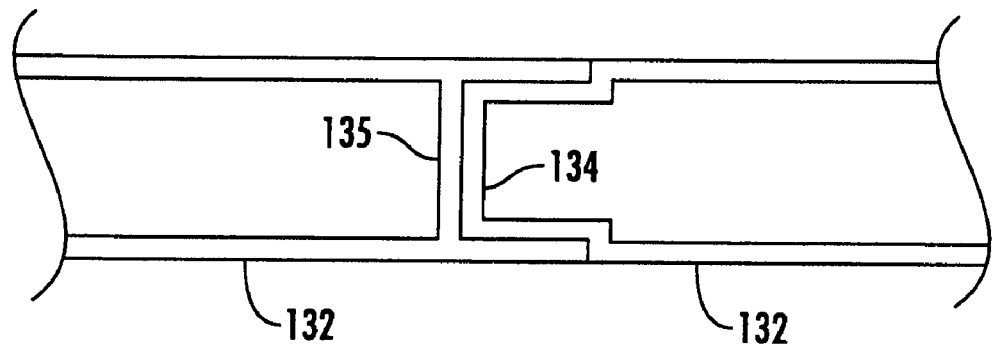
FIG. 24 is a cross-sectional view of the floor structure shown in FIG. 21 taken along line 24-24.
Figure 25:
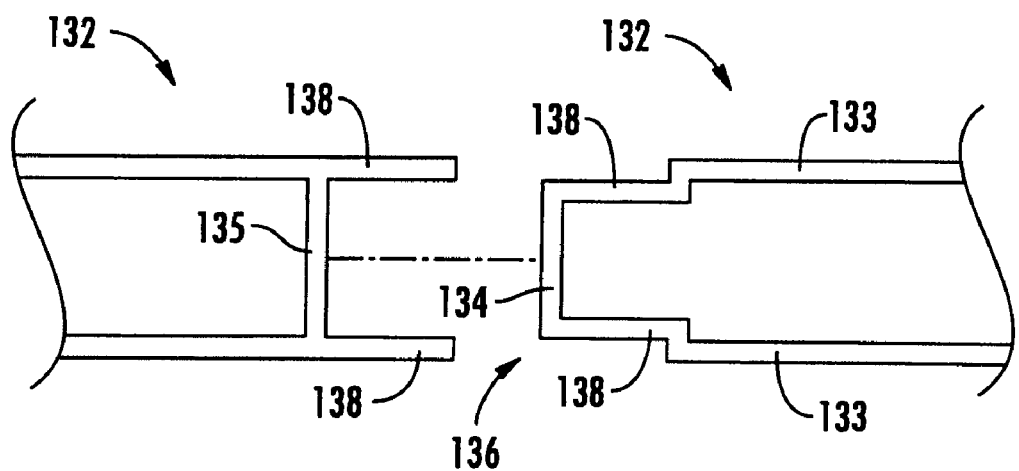
FIG. 25 is a partial exploded view of the cross-section shown in FIG. 24.

As shown in FIGS. 24-25, the floor panels 132 are assembled together without the need to provide a separate I-beam like structure between the panels as shown in FIG. 16. A closed end 134 of a first floor panel 132 is received within a C-shaped end 135 of an adjacent second floor panel 132. The geometries of the ends 134, 135 may be such that an interference fit is formed between the ends 134, 135 of the adjacent panels to secure them in place. According to other exemplary embodiments, an adhesive or other fastener may be used to secure the panels together (e.g., it may be provided either in the C-shaped end 135 or may be provided on the end 134 of the panel being inserted into the C-shaped end 135 of the adjacent panel). Any suitable geometry may be used for the ends 134, 135 to provide the desired fit between these ends to secure the adjacent panels together. Additionally, because each panel would be formed with one end, like end 134 and one end, like end 135, it may be desirable to "cap" the C-shaped end of the panel for the last panel in the floor assembly so that there is not an open end.

According to an exemplary embodiment, the floor panels 132 may be made from a reinforced polymeric material, such as a pultruded composite material. The support beams 140 may be formed of a metal or metal alloy or may be formed from a reinforced polymeric material such as a pultruded composite material.

Figure 33:
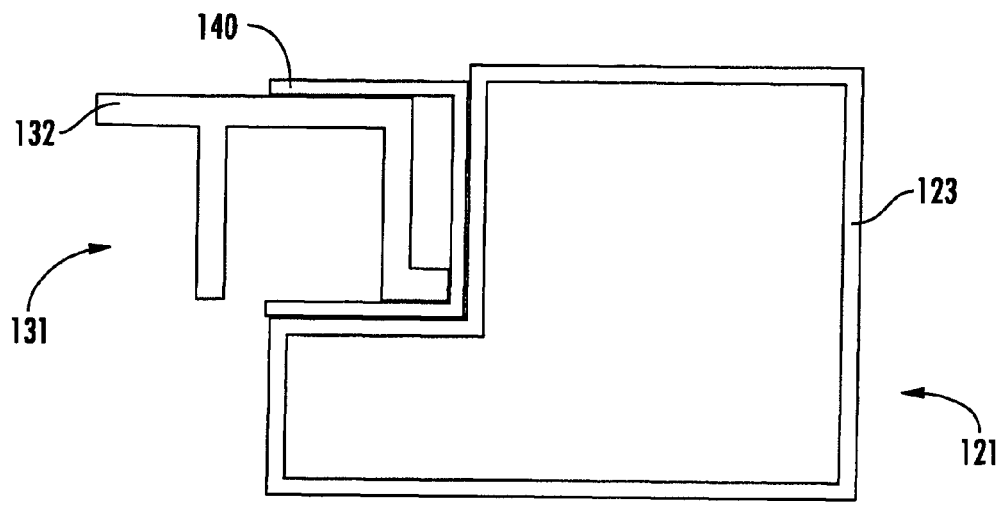
FIG. 33 is a cross-sectional view an exemplary embodiment of a floor structure coupled to a beam member.

FIG. 33 illustrates a cross-sectional view of the floor assembly 131 coupled to a frame structure such as the frame structure 121. The C-shaped cross-section of support beam 140 of floor assembly 131 is configured to nest within the void portion formed by the L-shaped cross-section of the lower horizontal frame member 123 of frame structure 121. The lower horizontal leg and vertical base wall of support beam 140 of floor assembly 131 may be coupled to the vertical and horizontal surfaces that are adjacent to the void portion of L-shaped cross-section of lower horizontal frame member 123. This configuration provides vertical structural support to the floor assembly 131 when subjected to vertical loading. The floor assembly 131, having the other side configured similarly, acts like a simply supported beam in distributing vertical loads into the load bearing horizontal frame member 123 of frame structure 121.

Figure 26:
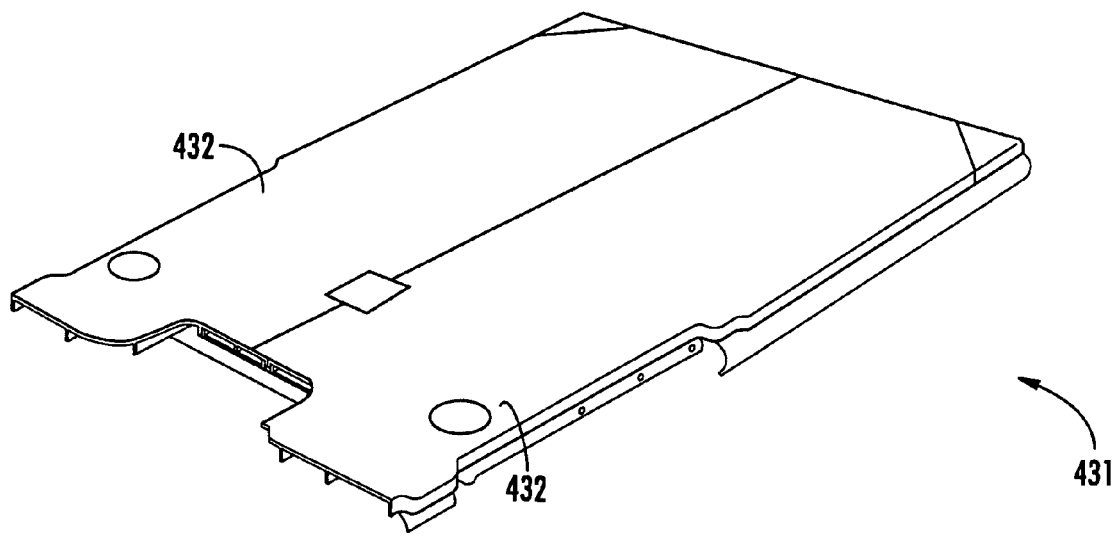
FIG. 26 is a perspective view of another exemplary embodiment of a floor structure.
Figure 27:
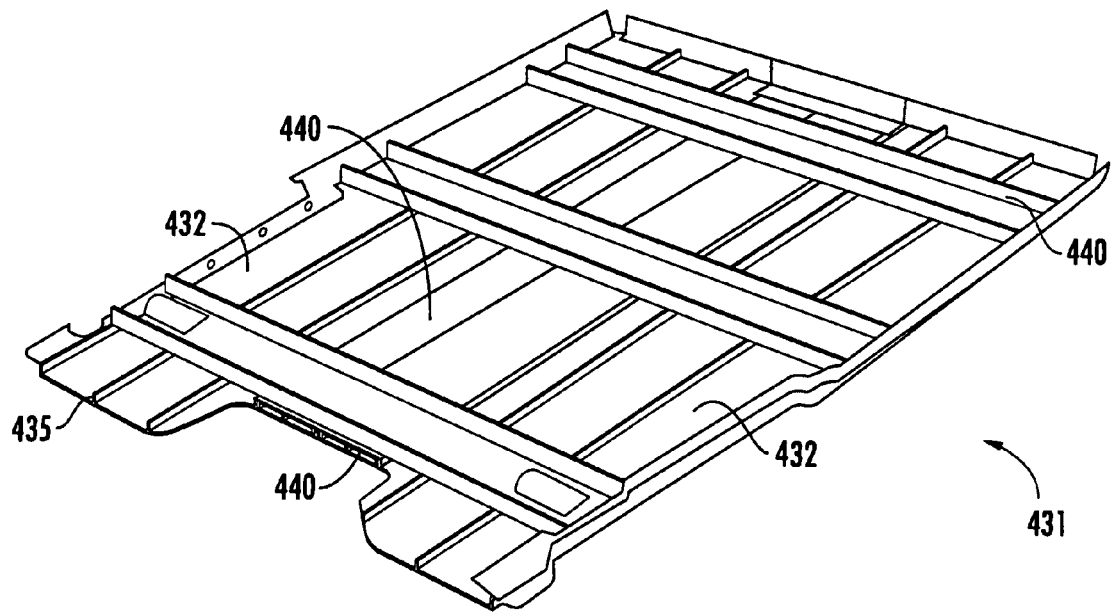
FIG. 27 is a bottom perspective view of the floor structure shown in FIG. 26.
Figure 28:
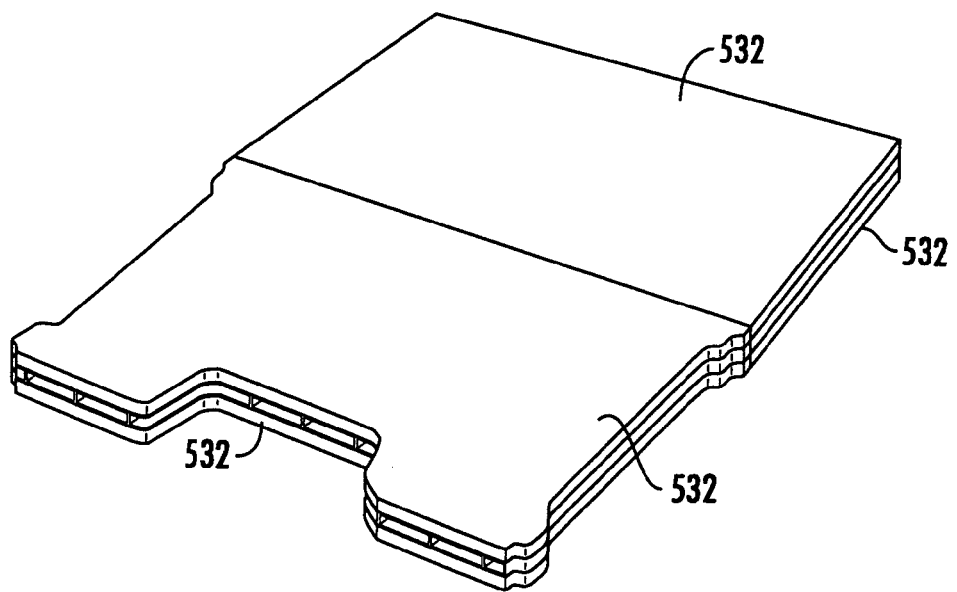
FIG. 28 is a perspective view of another exemplary embodiment of a floor structure.
Figure 29:
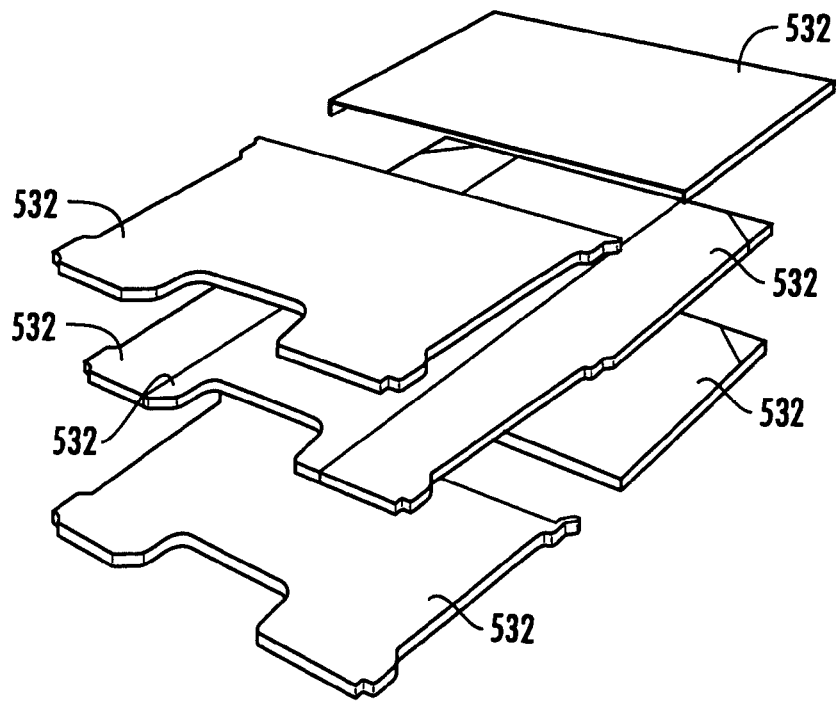
FIG. 29 is an exploded view of the floor structure shown in FIG. 28.

Referring to FIGS. 26 and 27, another exemplary embodiment of a floor assembly 431 is illustrated. Floor assembly 431 includes two floor panels 432 and five support beams 440. Floor panel 432 includes a substantially C-shaped cross-section and further includes a plurality of rib members 435, which are positioned between and parallel to the legs of the C-section at varied spacing. The floor panels 432 are adjacent to each other and coupled together using any suitable fastener, so that they form a line of coupling where the two panels come together. The floor panels 432 are configured so that the base of the C-section forms the load-bearing top surface of floor assembly 431 and the legs of the C-section and rib members 435 extend away from the base in the downward direction. Two support beams 440 are configured to run in the longitudinal direction or parallel to the line of coupling between the two floor panels 432. The longitudinally aligned support beams 440 are configured proximate and adjacent to each other next to the line of coupling between the floor panels 432. Three support beams 440 are configured to run perpendicular to the longitudinal direction or perpendicular to the other two support beams 440. According to an exemplary embodiment, support beams 440 are configured with C-shaped cross sections, and provide improved strength to floor assembly 431. According to other embodiments, support beams 440 may be configured to have any useful cross-section (e.g., box shaped, U-shaped, etc.).

According to other embodiments, floor assembly 431 may include any number or no support beams 440, and be tailored to provide the strength required by customer demand. The support beams 440 may be configured to run in any direction and may be coupled to the floor panels 432 or to other support beams 440 using any suitable fastener. According to other embodiments, any number of floor panels 432 may be included in floor assembly 431.

Referring to FIGS. 28-32, another exemplary embodiment of a floor assembly 531 is illustrated. Floor assembly 531 includes a top layer, a center layer, and a bottom layer, which are formed from a plurality of floor panels 532 coupled together. According to other embodiments, floor assemblies may include any number of layers with each layer including any number of floor panels.

Figure 30:
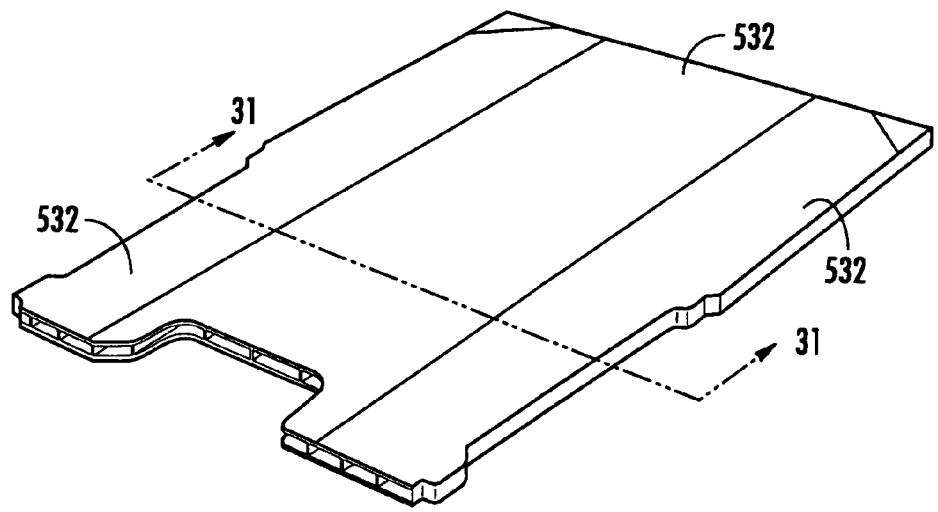
FIG. 30 is a perspective view of the center layer of the floor structure shown in FIG. 28.
Figure 31:
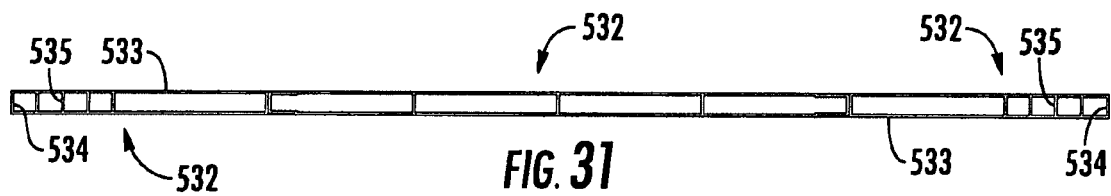
FIG. 31 is a partial cross-sectional view of the center portion of the floor assembly shown in FIG. 30 taken along line 31-31.
Figure 32:
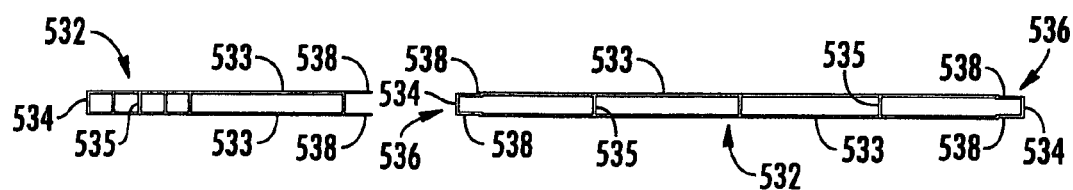
FIG. 32 is a partial exploded view of the cross-section shown in FIG. 31.

According to an exemplary embodiment, the center layer includes three floor panels 532 configured to have one center floor panel 532 coupled to a side floor panel 532 on each side, so that the lines of coupling are parallel and run in the longitudinal direction of vehicle 510 (see, e.g., FIGS. 30-31 for a cross-sectional view of the center layer).

According to an exemplary embodiment, the upper layer includes two floor panels 532 coupled, so that the line of coupling is perpendicular to the lines of coupling of the floor panels 532 of the center layer. The lower layer includes two floor panels 532 coupled, so that the line of coupling is perpendicular to the lines of coupling of the center floor panels 532 and parallel to the line of coupling of the upper floor panels 532.

According to an exemplary embodiment, a floor panel 532 may include two horizontal floor members 533 and two vertical floor members 534, which form a closed cross-section (e.g., rectangular), having a substantially hollow center portion, upon coupling. The two horizontal floor members 533 are substantially parallel to each other and substantially perpendicular to the vertical floor members 534. The thickness of floor panel 532 may be substantially thinner than its width or length. A floor panel 532 may also include a plurality of rib members 535, as shown in FIG. 31, which may extend between the horizontal floor members 533 in a substantially vertical direction to provide load bearing support. The rib members 535 may be spaced at different or similar widths as required to meet the loading of the specific application.

The floor panels 532 may include step down portions or ends 536. According to an exemplary embodiment, the center floor panel 532 includes ends 536 on the two sides which couple to the adjacent side floor panels 432, as shown in FIG. 31. An end 536 includes two members (or engaging members) 538, which are substantially parallel to the horizontal floor surfaces 533, as shown in FIG. 31. The members 538 of the end 536 have a thickness less than that between the upper and lower horizontal surfaces 533, and couple to the members 538 of the adjacent side floor panel 532. According to an exemplary embodiment, the members 538 of the adjacent side floor panels 532 are parallel to each other and perpendicular to the vertical end surfaces or end walls 534, and together form a C-shaped end for receiving the end 536 of the center floor panel 532. The upper member 538 of the side floor panel 532 sits above and proximate to the upper member 538 of the center floor panel 532, and the lower member 538 of the side floor panel 532 sits below and proximate to the lower member 538 of the center floor panel 532. The end 536 of one side of center floor panel 532 engages one of the side floor panels 532, and the end 536 on the other side of the center floor panel 532 engages the other side floor panel 532.

A floor assembly which includes multiple floor panels configured to have varying direction of coupling and ribs, provides improved strength, much like having a system of alternating perpendicular fibers within one part. According to other embodiments, a floor assembly may have as many layers of floor panels as required to support the loading condition of the application. According to other embodiments, a floor assembly may also include multiple layers that are configured with the rib and coupling directions running the same direction.

According to other embodiments, floor assembly 531 may include support beams 540, which may run in any useful direction and be coupled using any suitable fastener. Support beams 540 may have C-shaped cross-sections or other useful cross section (open or closed), and may span the entire length or width of the floor assembly 531, or may span a distance shorter or longer than the length of width of the assembly. Support beams 540 may be configured to be below, above, or between the floor panels 532 of the floor assembly 531.

Figure 34:
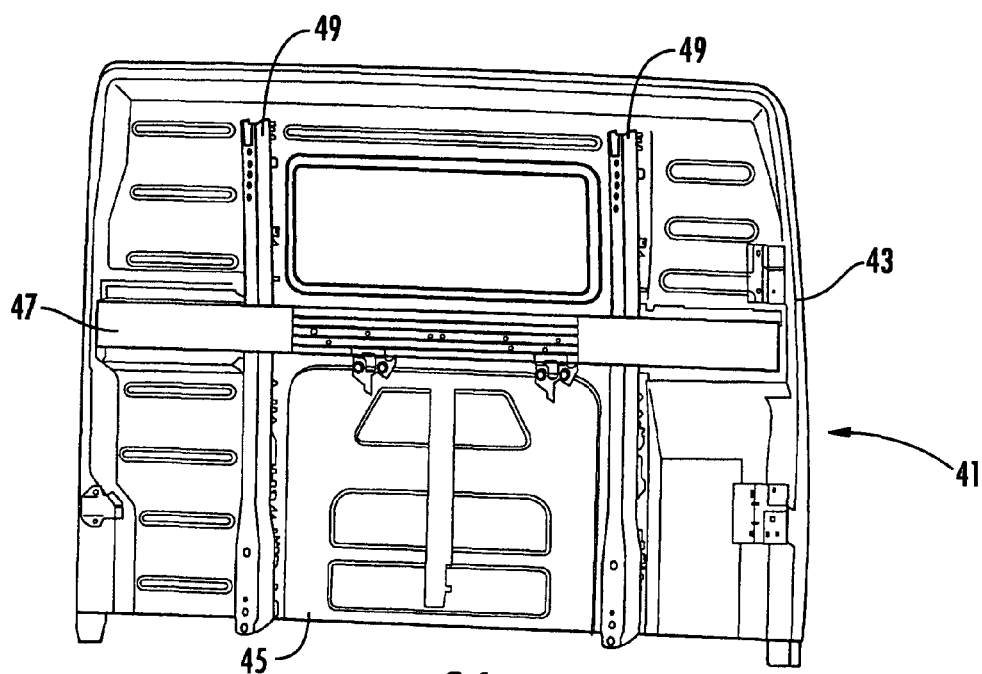
FIG. 34 is a perspective view of an exemplary embodiment of a back assembly for a modular sleeper cab assembly such as the modular sleeper cab assembly shown in FIG. 4.
Figure 35:
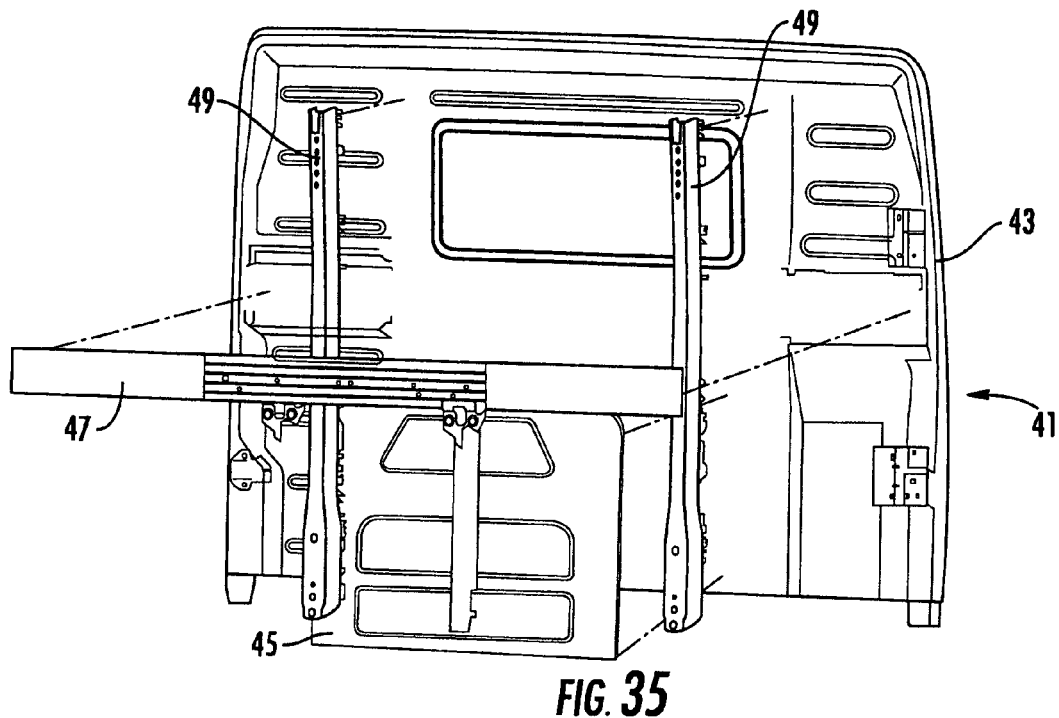
FIG. 35 is an exploded perspective view of the back assembly shown in FIG. 34.

Referring to FIGS. 34 and 35, an exemplary embodiment of a back assembly 41 is illustrated, and includes an outer panel 43, an inner panel 45, a horizontal support 47, two vertical supports 49. Outer panel 43 includes an outer surface, which provides aesthetics, and an inner surface, which provides for coupling to. Outer panel 43 may be substantially flat, having features to improve strength, such as embosses, ribs, and flanges. Inner panel 45 may be coupled to the outer panel 43 and may provide for improved strength by forming a substantially closed section with the outer panel 43. Vertical and horizontal supports 49, 47 may further improve the strength of the back assembly 41, by having useful cross-sections (e.g., C-shape, U-Shaped, box-shaped). The outer panel 43, inner panel 45, and supports 47, 49 may be coupled using any suitable fastener. According to other embodiments, back assemblies 41 may further include one or more than one voids 64, whereby each void 64 may be filled by a window 56.

Figure 36:
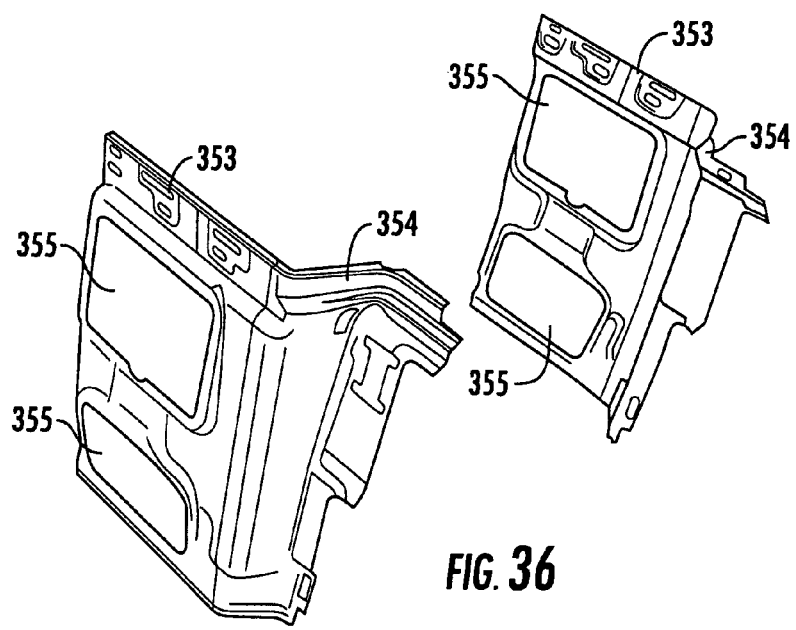
FIG. 36 is a perspective view of an exemplary embodiment of a side panel for a modular sleeper cab assembly.

Referring to FIG. 36, an exemplary embodiment of a side assembly 351 is illustrated, and includes an outer panel 353 and a transition panel 354 coupled together using any suitable fasteners. Outer panel 353 may be made from a single layer or multiple layers coupled together, and may include openings or apertures 355 provided therein to provide locations for windows, storage compartments, and the like. Outer panel 353 may be substantially flat or may include embossed or offset portions to increase strength or provide for improved coupling to other panel members. Transition panel 354 is made to cover the frame structure 321 in its transition portion, where the sleeper box narrows to form the width of the cab or driving compartment. Transition panel 354 may include one layer that is substantially flat or it may include several offset surfaces, such as shown in FIG. 34. The outer surfaces of the outer panels 353 and the transition panels 354 may be configured to be aesthetic, to match the vehicle. Side panel 351 may further include one or more than one window members 356, which may fill the void portions of the outer panel 353, and may be coupled to the outer panel 353 using any suitable fastener. Window members 356 may be made from glass, any composite glass material, or any other transparent or translucent material, depending on the application.

Referring to FIGS. 37-38, another exemplary embodiment of a side assembly 51 is illustrated, and includes an outer panel 53. Outer panel 53 may be substantially flat with flanges at the edges to improve strength. Outer panel 53 may include one or more openings or apertures 64 (e.g., voids), whereby each void may be filled with window 56, and may have an outer surface configured to provide matching vehicle aesthetics. According to an exemplary embodiment, outer panel 53 includes two windows 56 coupled to it using any suitable fastener. According to another exemplary embodiment, side assembly 51 may further include an inner panel 55 coupled to the inner surface of the outer panel 53.

Referring to FIG. 39, the box section that is formed from coupling a back panel 141 and a side panel 151 is illustrated. To improve structural rigidity of the modular cab assembly 120, the panels, such as the back panel 141 and the side panel 151, may have ends with open shaped cross-sections (e.g., L, W, C) that when coupled form a closed shaped cross-section (e.g., box). According to an exemplary embodiment, rear panel 141 may include two ends, each having a W-shaped cross-section with outer legs being substantially perpendicular to each other and with the inner legs being substantially perpendicular to each other and to the outer legs. According to an exemplary embodiment, side panel 151 includes an end having a L-shaped cross-section with the leg being substantially perpendicular to the base. The outer surfaces of the outer legs of the rear panel 141 may be coupled to the inner surfaces of the L-shaped end of the side panel 151, forming a corner having a closed box-section with improved strength. According to other embodiments, the rear and side panel may have other shapes to form other improved structural corners.

It should be noted that the closed structural corners may be used as HVAC members to carry heated or cooled air to the compartment of the sleeper, or may be used to carry wiring harnesses, or may be filled with a structural material (e.g., structural foam). These corners may be used to improve strength, increase insulation for sound dampening or thermal purposes, or for other useful purposes.

According to an exemplary embodiment, the various components of the assemblies 20, 120, 220, 320 may be coupled or joined as discussed through any combination of mechanical fastening (e.g., rivets or screws), chemical fastening (e.g., adhesives), or other fastening method (e.g., ultrasonic or hot gas welding)

According to an exemplary embodiment, various components of the assemblies 20, 120, 220, 320 may be formed from a composite material. For example, according to an exemplary embodiment, the floor assembly members, frame structure members, back assembly members, side assembly members, roof assembly members, walls, and door assemblies may be made of a glass or carbon fiber-reinforced resin (e.g., a polyurethane or acrylonitrile-butadiene-styrene (ABS) resin matrix material that includes fiberglass strands, mats, rovings, or the like embedded within the matrix material). According to other exemplary embodiments, a polyester or vinyl ester resin system may be used for the matrix material. According to other exemplary embodiments, the members, walls, assemblies, and panels may be made of alloys (e.g., steel, aluminum), or made from any combination of materials. Different types of reinforcement materials may also be used according to various exemplary embodiments. For example, according to an exemplary embodiment, both uni-directional and mat-type and/or chopped fiber reinforcements may be used within a single component. Any suitable polymeric resin (e.g., thermosetting or thermoplastic resins) and reinforcement material may be used according to various exemplary embodiments. It should also be noted that different components may be made of different materials (e.g., if one component requires more strength than another component, additional or different reinforcement materials and/or matrix materials may be used to provide enhanced strength and/or rigidity). The composite components may be individually manufactured using a pultrusion process according to an exemplary embodiment, although it should be understood that other processes such as extrusion, thermoforming, injection molding, or other suitable processes may be used according to other exemplary embodiments.

One advantageous feature of using composite materials for the various components of the assemblies 20, 120, 220, 320 is that the overall structure of the assemblies will be lighter than if the assemblies were made from materials such as metals. The reinforcement materials that are utilized within the composite materials may provide enhanced strength for the components that are suitable for the demands that will be placed on the assemblies.

One advantageous feature of the assemblies shown and described herein is that the manufacture and assembly of the assemblies may be relatively simple and inexpensive. In addition to the fact that the various components are formed of a lightweight and inexpensive composite polymeric materials, the dimensions of the structures may be altered having quick change-over times without the need to purchase separate tooling. For example, if a sleeper cab having different dimensions is required, the frame structure members can be manufactured using the same equipment and cut to length. More or fewer floor panels (e.g., floor panels 32) may be used and/or the floor members may be cut to a different length to provide a floor having a different dimension. Side and rear panels may also be cut to size as desired.

This dimensional flexibility may also be achieved by using different inserts in the core or cavity halves of molds to reduce piece cost and tooling cost. This modularity improves the ability of a manufacturer of the assemblies to respond to customer requirements in a relatively quick and efficient manner, without the need to redesign and purchase new tooling for the majority of the components of the assembly. This modularity also provides for a shorter validation period and less expensive validation process. Additionally, this modularity also provides for less expensive repairs for service.

According to an exemplary embodiment, a modular roof assembly may also be utilized in conjunction with any of the assemblies described above. An exemplary embodiment of a modular roof assembly may comprise a front outer panel, a front inner panel, right side outer panel, right side inner panel, a left side outer panel, a left side inner panel, a rear outer panel, a rear inner panel, a top outer panel and a top inner panel. An exemplary modular roof assembly may be constructed using multiple members of varying cross section and length made from a composite material, such as a resin reinforced by a fiber (e.g. polyurethane reinforced by fiberglass), preferably manufactured through a compression molded process. The use of composite materials manufactured through the compression molding process leads to durable and high strength components which are light weight and less expensive than traditional steel components. These compression molded components offer protection from chemical reactions (e.g. oxidation) which is problematic to steel parts. Additionally, a modular compression molded roof assembly offers improved acoustic properties by reducing the exterior noise level inside the sleeper box. An exemplary modular roof assembly's members may be joined using any combination of mechanical fastening (e.g. rivets or self tapping screws), chemical fastening (e.g. adhesives), or other fastening (e.g. welding techniques such as ultrasonic or hot gas).

An exemplary embodiment of a modular compression molded roof assembly is geometrically flexible, with the ability to modify its length, width, or height to accommodate changing customer dimensions. Additionally, multiple modular roof assemblies may use the same compression molded front and rear members and incorporate different side members to compensate for length variations, or may use the same compression molded side members and incorporate different front and rear members to compensate for width variations.

A modular roof assembly may incorporate inner panels which may be designed to maximize strength properties, by increasing the member's moment of inertia, while keeping mass down. The outer panels of the modular roof assembly may be designed primarily for aesthetic purposes per customer requirements but may incorporate supports or ribs to improve strength and may be joined to the inner panels. Both the inner and outer panels may be constructed of one piece panels or may be constructed of multiple panels joined together using any combination of mechanical fastening (e.g. rivets or self tapping screws), chemical fastening (e.g. adhesives), or other fastening (e.g. welding techniques such as ultrasonic or hot gas).

An alternative embodiment of a modular roof assembly may incorporate the use of laminated or non-laminated EPP, expanded polypropylene, foam between the inner and outer panels of the roof assembly to enhance the thermal and acoustic properties of the sleeper box. The laminated EPP foam may also be used to fill the hollow portions of the varying cross sections of the inner panels or in other useful locations. According to other embodiments, other foams and materials may be used to enhance the thermal and acoustic properties of a modular roof assembly.

Figure 40:
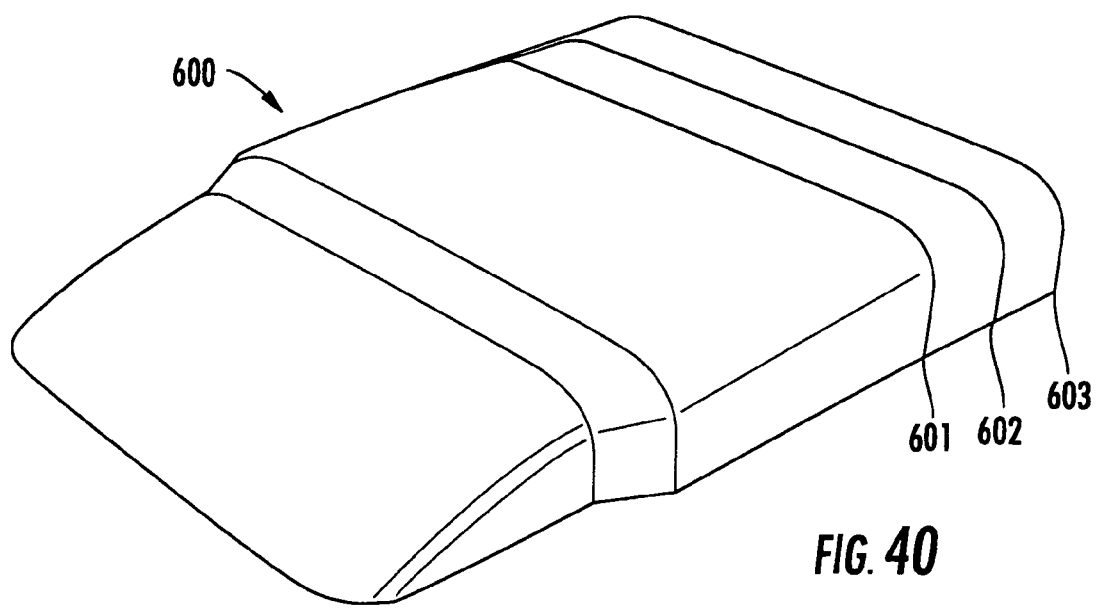
FIG. 40 is a perspective view of an exemplary roof assembly illustrating its dimensional flexibility.

Referring to FIG. 40, an exemplary outer panel of a roof assembly 600 is shown according to an exemplary embodiment illustrating the dimensional flexibility of the compression molded manufacturing process that may be used to manufacture specific components of the roof assembly. Roof assembly 600 may be formed to a variety of lengths. For example, according to a first exemplary embodiment, the roof assembly may have a rear edge as indicated with reference numeral 601. According to another exemplary embodiment, the roof assembly may be somewhat longer, and may have a rear edge as indicated with reference numeral 602 or 603.

The dimensional flexibility of the roof assembly may be achieved by using different inserts in the core or cavity halves of a mold used to form the roof assembly. Such a process acts to reduce piece cost and tooling cost. The dimensional flexibility is not limited to lengths as illustrated in FIG. 40, but may allow for variations in width, height, thickness, or any combination thereof by using inserts in different portions of a mold. In this manner, the need to purchase different molds for each different roof assembly having varying dimensions may be eliminated, thus providing potentially significant tooling cost savings. The flexibility of a modular roof assembly is not limited to its dimensional properties as its geometry may be varied to provide for inclusion of or attachment of other features and components. The roof assembly may be constructed using a one-piece panel with no panel openings, as illustrated. According to other embodiments, roof assemblies may be constructed using multiple panels and may incorporate panel openings.

Figure 41:
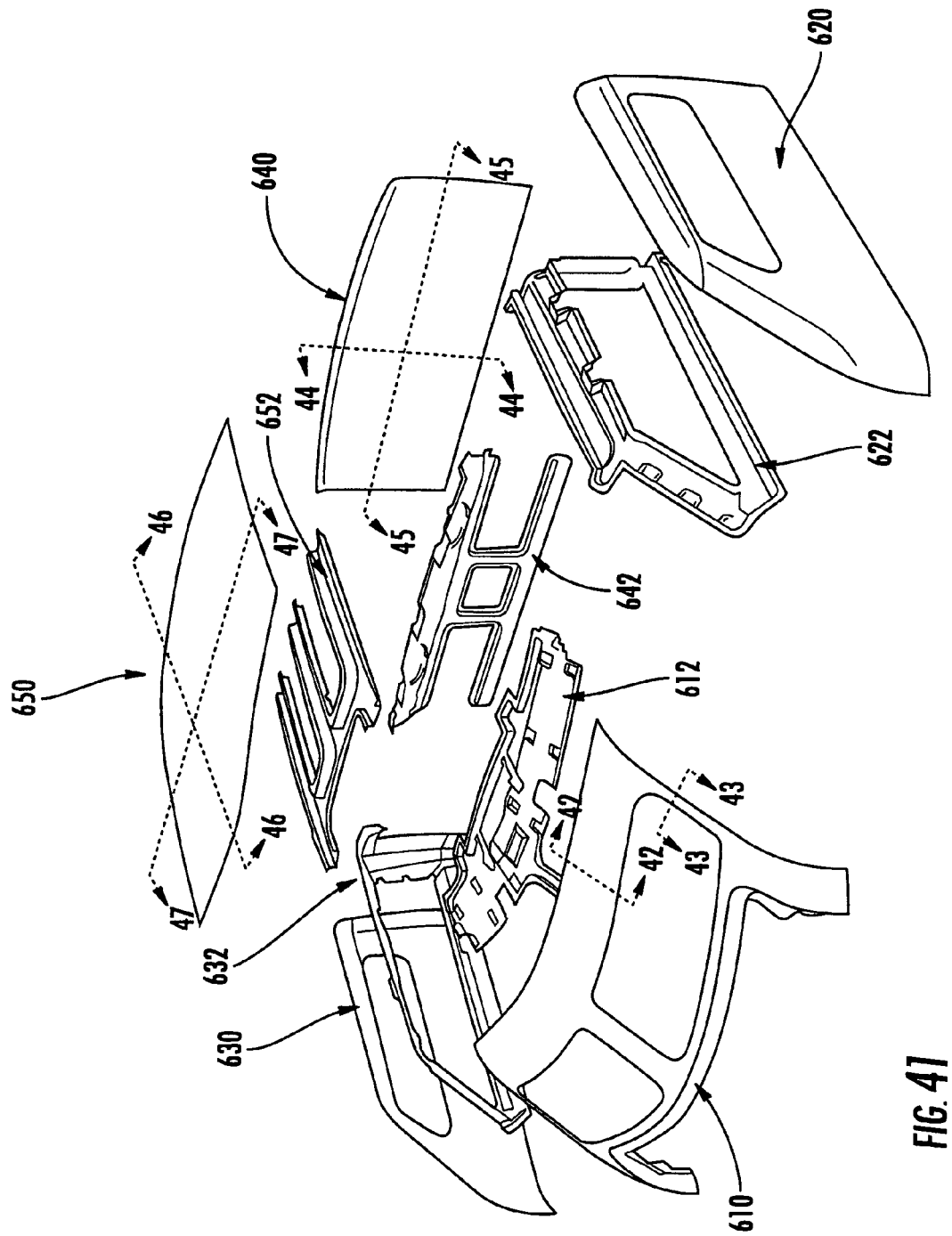
FIG. 41 is an exploded perspective view of an exemplary embodiment of a roof assembly.
Figure 42:
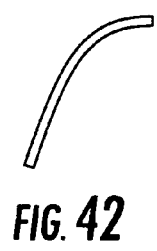
FIGS. 42-47 are cross-sectional view of various components shown in FIG. 41.
Figure 43:
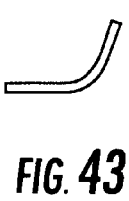
Figure 44:
Figure 45:
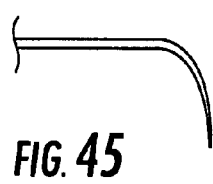
Figure 46:
Figure 47:

Referring to FIG. 41, an exemplary embodiment of a modular roof assembly is illustrated in an exploded manner and may comprise of a front outer panel 610, a front inner panel 612, a right side outer panel 620, a right side inner panel 622, a left side outer panel 630, a left side inner panel 632, a rear outer panel 640, a rear inner panel 642, a top outer panel 650 and a top inner panel 652. Cross-sectional view of various components are shown in FIGS. 42-47.

According to other embodiments, a modular roof assembly may include any combination of panels. The panels comprising a modular roof assembly may be constructed using multiple members of varying cross section and length made from a composite material, such as a resin reinforced by a fiber (e.g. polyurethane reinforced by fiberglass), preferably manufactured through a pultrusion process. The panels comprising a modular roof assembly may be joined together using any combination of mechanical fastening (e.g. rivets or self tapping screws), chemical fastening (e.g. adhesives), or other fastening (e.g. welding techniques such as ultrasonic or hot gas). Components 610, 620, 630, 640, and 650 may be molded to varying dimensions by placing inserts in the mold cavity used to form such components according to an exemplary embodiment.

Figure 48:
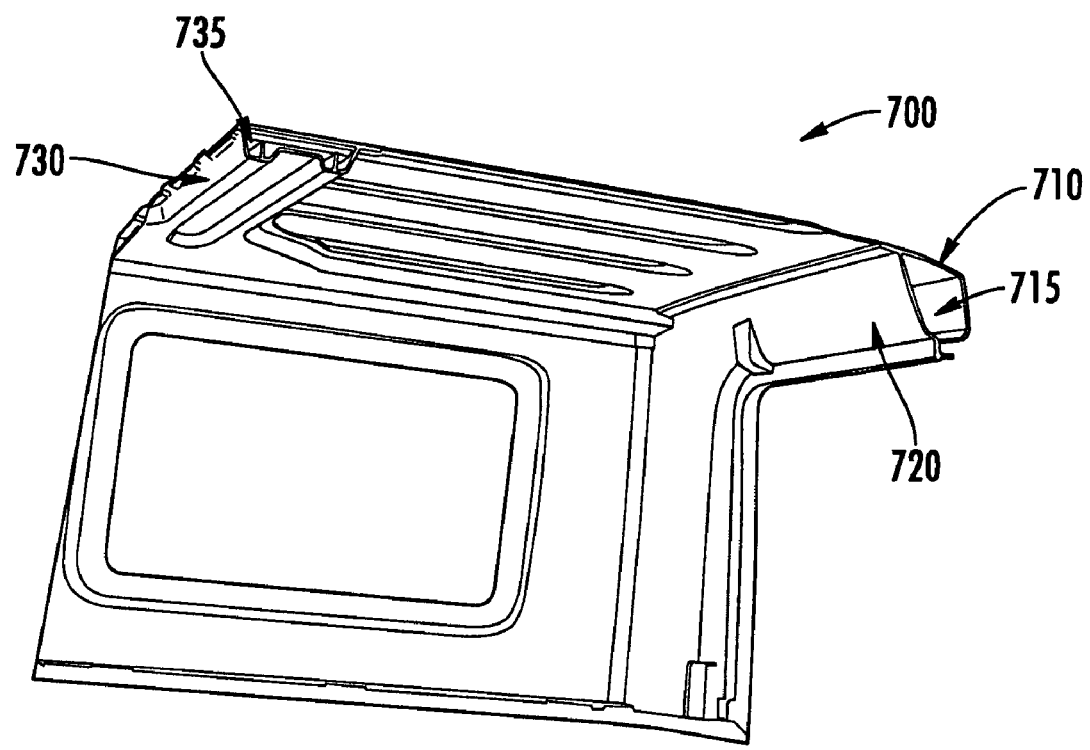
FIGS. 48 and 49 are sectional views of a portion of a modular roof assembly according to an exemplary embodiment.
Figure 49:
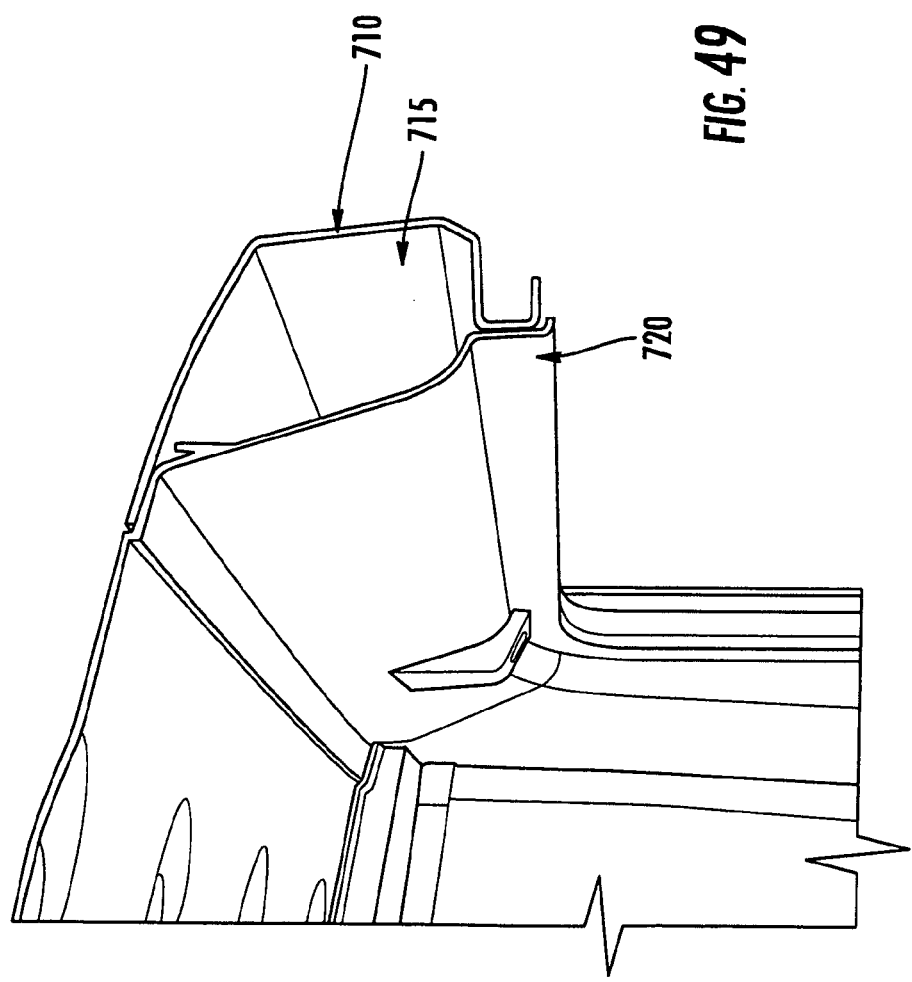

Exemplary panels for a modular roof assembly may be coupled with other panels or support components to increase the structural rigidity of the assembly by increasing the design properties (e.g., moment of inertia) through the use of improved geometries, such as closed sections and strengthening ribs. These closed sections may be filled with a foam (e.g., EPP) or other useful material to enhance the thermal and acoustic properties of the assembly. This can also be used to form relatively complex geometries by combining relatively simple components together. For example, as shown in FIGS. 48-49, a roof assembly 700 includes a first panel 710 intended to provide an outer surface for the roof assembly 700 that is coupled to a second panel 720 that forms an inner surface of the roof assembly 700. A space or channel 715 is formed between the two panels, and may be filled with foam or another material or remain empty. The coupling of panel 710 to panel 720 provides enhanced structural rigidity in this region. As also shown in FIG. 48, a panel 730 is coupled to the underside of an upper portion of the roof assembly, and may define a space or channel 735 therebetween (which again may be empty or filled with foam or another suitable material).

Figure 50:
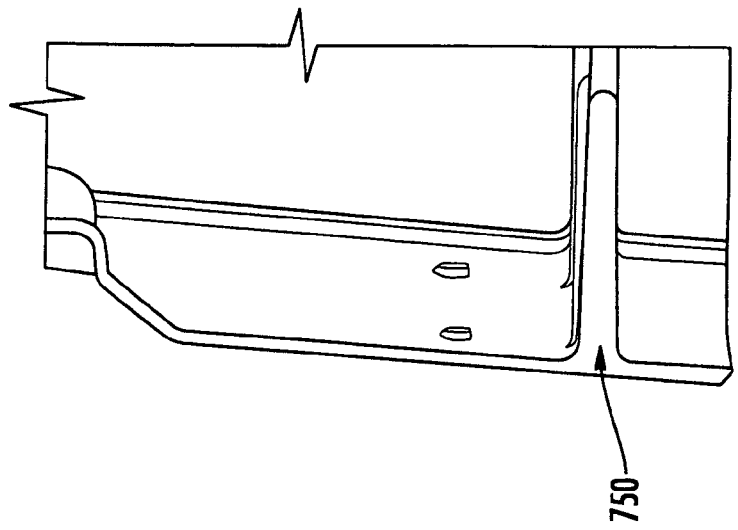
FIG. 50 shows an exemplary design of a rib section used for hard mounting panels together for permanent attachment.

FIG. 50 shows an exemplary design of a rib section used for hard mounting panels together for permanent attachment. A rib 740 extends into a feature in a panel for mounting the panels together.

Figure 51:
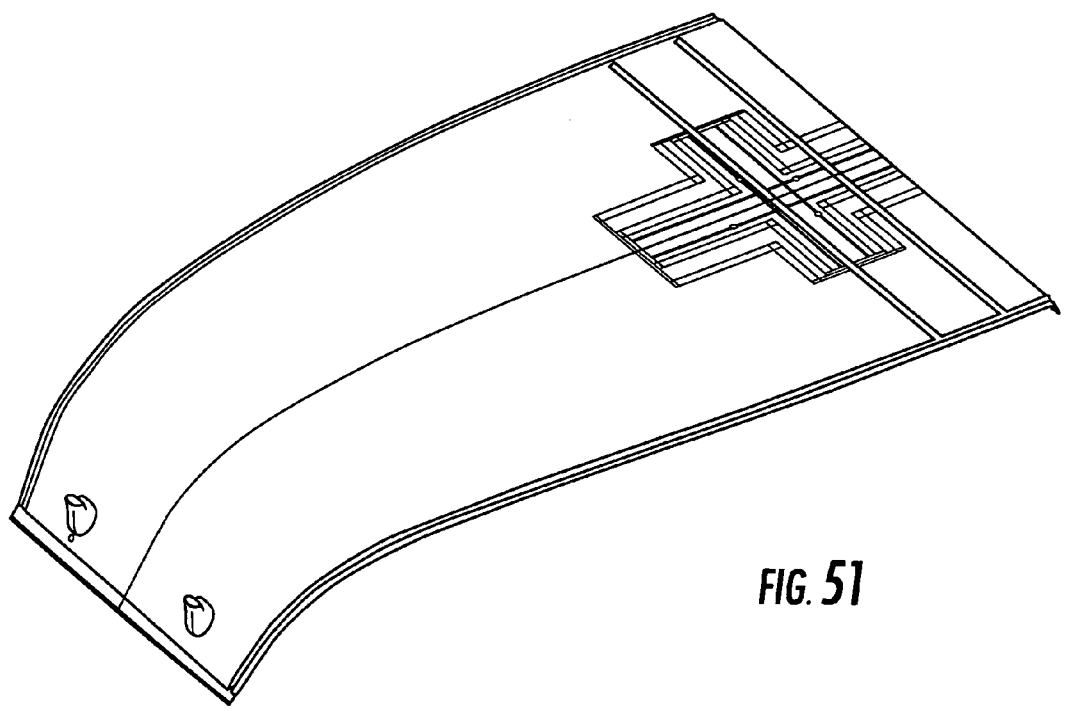
FIG. 51 is a perspective view of a roof panel according to an exemplary embodiment.

Referring to FIG. 51, an exemplary embodiment of a roof panel for constructing a roof assembly is illustrated. An exemplary roof panel may be constructed to incorporate one or more of the panels (e.g., top outer panel, rear outer panel, front outer panel) illustrated in FIG. 41 and may be made per methods disclosed above. Different exemplary embodiments may be made from the same base tool using tooling inserts to produce low cost embodiments with varying dimensional parameters (e.g., length, width). The use of tooling inserts allows for low cost flexibility, with quick change over times, to produce multiple variants of a similar design to accommodate different customer requirements.

Figure 52:
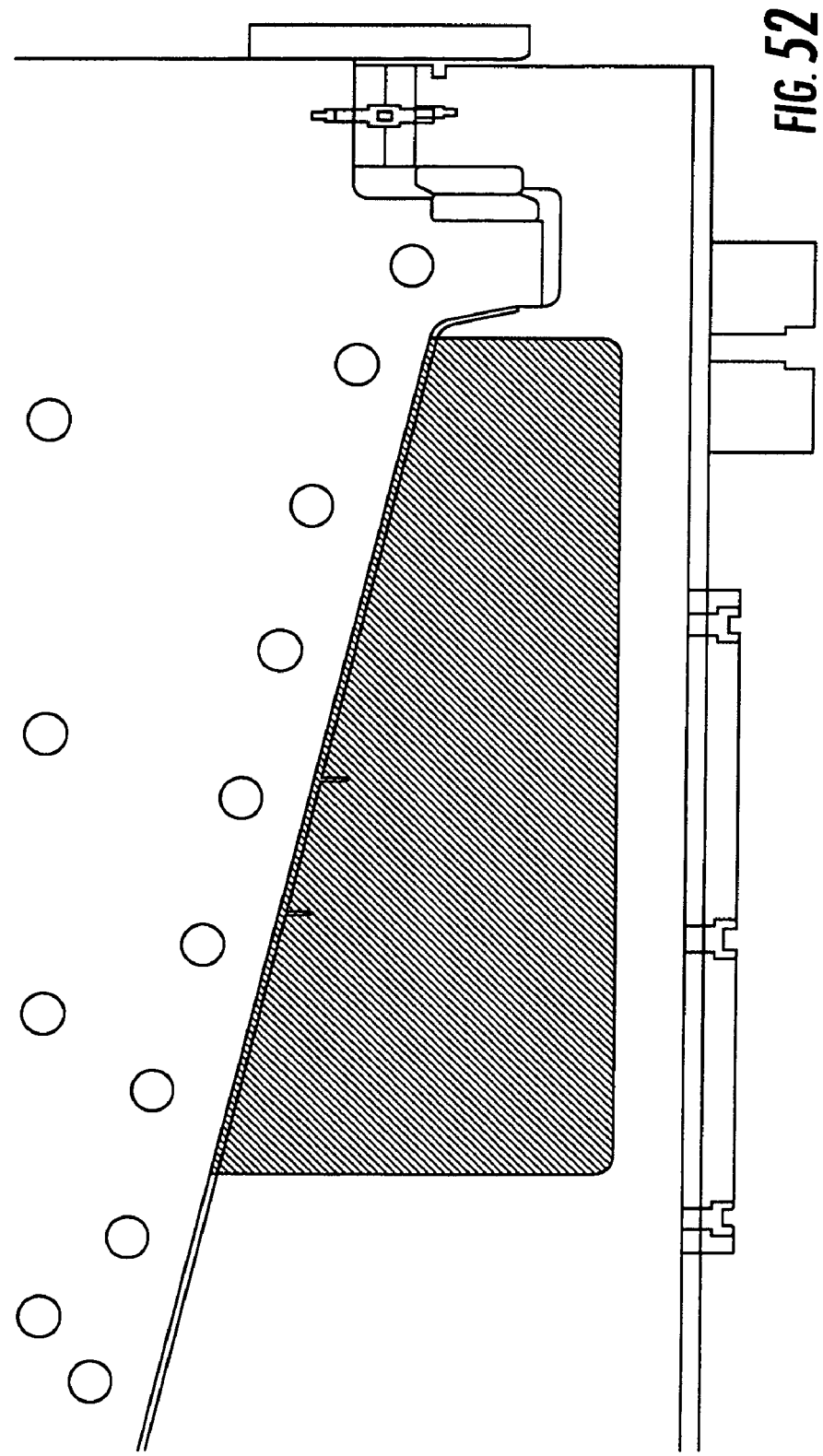
FIGS. 52-54 are side views of inserts for tooling used to construct exemplary embodiments of modular roof panels according to various exemplary embodiments.
Figure 53:
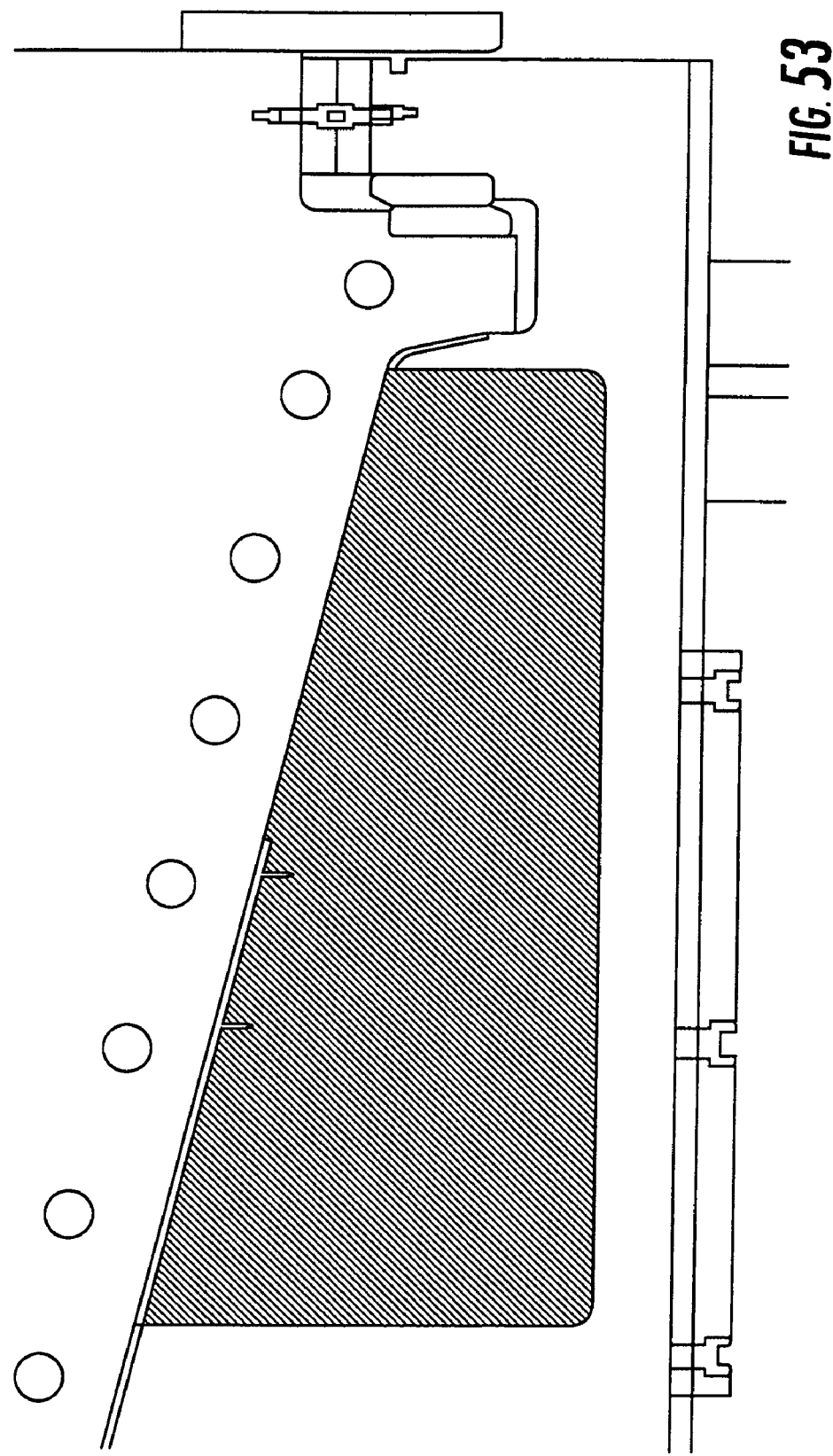
Figure 54:
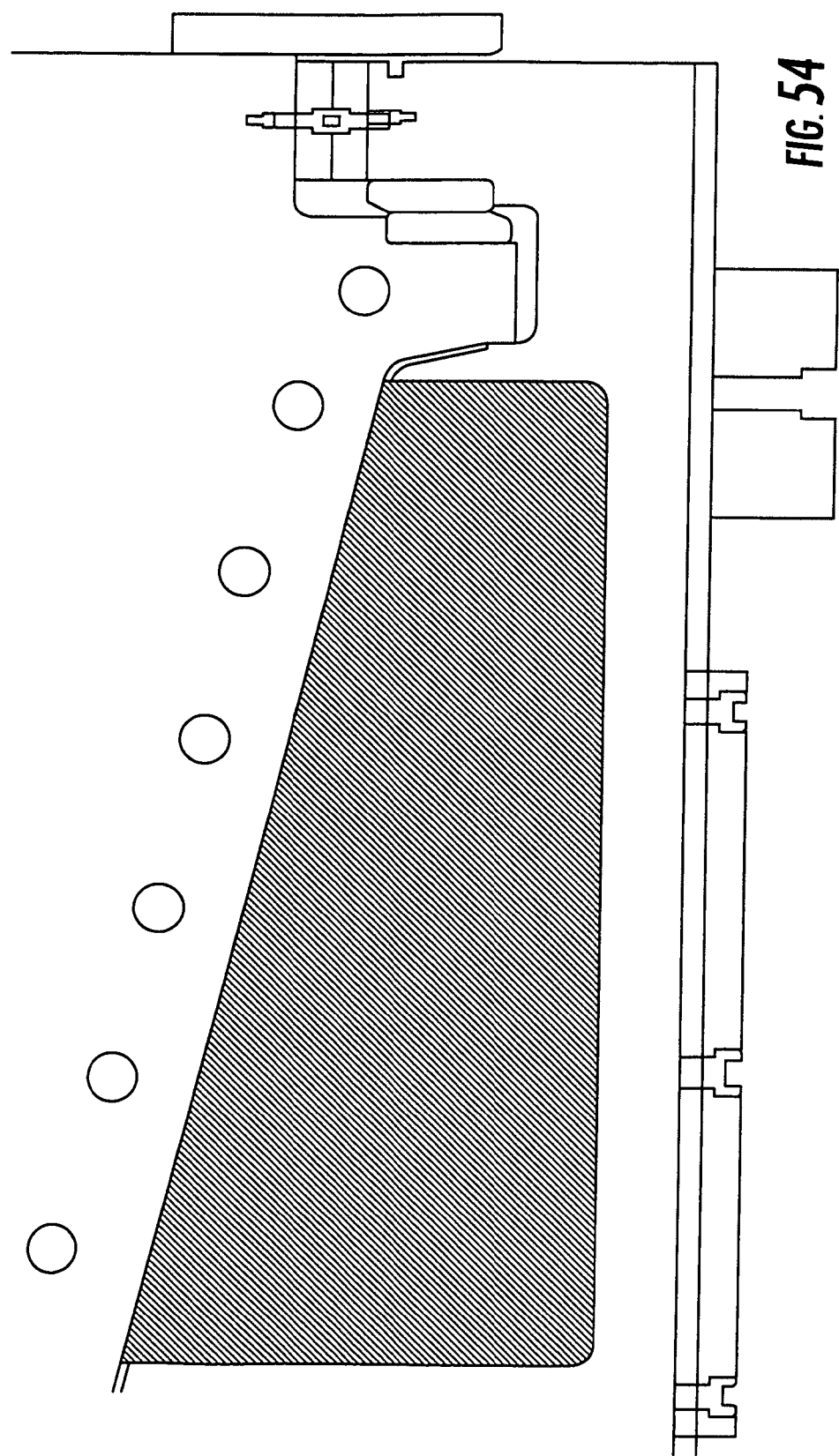

Referring to FIGS. 52-54, exemplary embodiments of different tooling inserts for use in constructing dimensionally varying embodiments of the roof panel of FIG. 51 are illustrated. FIG. 52 shows a core insert tooling that may be used to construct a roof panel with a length of 72", while 53 and 54 show core insert tools that may be used to construct roof panels with lengths of 60" and 48" respectively (e.g., inserts are provided in the mold so that the cavity is smaller, such that when polymer flows into the cavity, the resulting piece has smaller dimensions than if the inserts were not provided in the cavity). According to an exemplary embodiment, all inserts start off the same size with different cavity seal-offs. All inserts would be accessible from the top side for quick changeovers.

The tools share a common base tool and to change from one roof panel embodiment to another embodiment only the insert tool needs to be replaced with a different respective insert tool. The insert tool may seal off a different amount of the tool to vary specific dimensions (e.g., length), meaning the base tool may be made to construct the largest roof panel and by adding inserts which either reduce size or modify geometry, additional variants are made from the same base tool. The use of insert tools reduces tooling costs and may be substituted without requiring a complete tool change over, thus making for a change over which requires less labor taking less time. FIGS. 52-54 show tool inserts that manufacture roof panels of 48", 60" and 72" length, but the number of variants is flexible as are the dimensions flexible and not limited to that which is illustrated.

According to other embodiments, multiple variants of roof panels are not limited to varying dimensional properties and may be made with different geometries to accommodate other components or features. For example, the use of insert tooling allows for the change over from a base roof panel to another roof panel that includes additional features (e.g., skylight, overhead lights) which would be optional upgrades for the customer.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular sleeper box as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A sleeper cab assembly for a vehicle comprising:
   a frame configured to provide a support structure for at least a portion of the sleeper cab assembly, the frame comprising a plurality of frame members coupled together, each of the frame members formed of a reinforced polymeric material; and
   a floor assembly coupled to the frame, the floor assembly comprising a plurality of floor panels formed of reinforced polymeric material coupled together, wherein each of the plurality of floor panels is generally hollow and comprises at least one rib extending from a first surface of the floor panel to a second surface of the floor panel to provide strength for the floor panel.

2. The assembly of claim 1, wherein at least one of the plurality of floor panels is at least partially filled with a foam material to provide enhanced strength for the floor panel.

3. The assembly of claim 1, further comprising a coupling member coupling a first of the plurality of floor panels to a second of the plurality of floor panels, wherein a portion of each of the first and second floor panels nests within a portion of the coupling member.

4. The assembly of claim 1, wherein the plurality of floor panels comprise a first floor panel and a second floor panel, wherein a portion of the first floor panel nests within a portion of the second floor panel.

5. The assembly of claim 1, wherein the plurality of floor panels are coupled together with an adhesive.

6. A sleeper cab assembly for a vehicle comprising:
   a frame configured to provide a support structure for at least a portion of the sleeper cab assembly, the frame comprising a plurality of frame members coupled together, each of the frame members formed of a reinforced polymeric material; and
   a floor assembly coupled to the frame, the floor assembly comprising a plurality of floor panels formed of reinforced polymeric material coupled together, wherein the floor assembly further includes at least one corner support.

7. The assembly of claim 1, wherein the floor assembly further includes at least one support beam extending between a first floor panel and a second support panel.

8. The assembly of claim 1, wherein the plurality of frame members comprise a plurality of vertical frame members and a plurality of horizontal frame members, wherein the vertical frame members have a cross-sectional shape that differs from a cross-sectional shape of the horizontal frame members.

9. The assembly of claim 1, wherein the sleeper cab assembly includes a first portion having a first width and a second portion having a second width that is less than the first width, and wherein the frame comprises a transition portion between the first portion and the second portion.

10. The assembly of claim 1, further comprising a plurality of panels coupled to the frame, the panels comprising a polymeric material.

11. The assembly of claim 1, wherein the reinforced polymeric material comprises glass fibers in a polymer matrix.

12. A sleeper cab assembly for a vehicle comprising:
   a structure formed from a plurality of fiber reinforced polymeric members joined together and configured to define a sleeper box;
   a floor comprising a plurality of floor panels coupled together, the floor panels formed from a fiber reinforced polymeric material, wherein the plurality of floor panels each are generally hollow and have at least one rib extending from an upper surface to a lower surface within the panel to provide added strength for the panel; and
   a plurality of panels coupled to the structure.

13. The assembly of claim 12, wherein at least a portion of each of the plurality of floor panels is filled with a foam.

14. The assembly of claim 12, further comprising at least one coupling member configured to couple two of the plurality of floor panels together.

15. The assembly of claim 12, wherein the plurality of floor panels each include a first end and a second end, wherein a first end of a first floor panel is positioned within a second end of an adjacent second floor panel.

16. The assembly of claim 12, wherein the fiber reinforced polymeric members are configured to mate with other fiber reinforced polymeric members to form the structure.

17. A vehicle comprising:
   a sleeper cab comprising a frame and a floor assembly coupled to the frame, wherein the floor assembly comprises a plurality of floor panels coupled together, each of said plurality of floor panels is a generally hollow member formed from a reinforced polymeric material; and
   at least one of the frame and the floor assembly formed at least in part from a reinforced polymeric material.

18. The vehicle of claim 17, wherein each of the plurality of floor panels comprises at least one member within the floor panel that extends between opposing portions of the floor panel to provide enhanced strength for the floor panel.

19. The vehicle of claim 17, wherein the plurality of floor panels are at least partially filled with a foam material to provide enhanced strength for the floor panel.

20. The vehicle of claim 17, further comprising a coupling member coupling a first of the plurality of floor panels to a second of the plurality of floor panels, wherein a portion of each of the first and second floor panels nests within a portion of the coupling member.

21. The vehicle of claim 17, wherein the plurality of floor panels comprise a first floor panel and a second floor panel, wherein a portion of the first floor panel nests within a portion of the second floor panel.

22. The vehicle of claim 17, wherein the plurality of floor panels are coupled together with an adhesive.

23. The vehicle of claim 17, wherein the floor assembly further comprises at least one corner support inserted within a portion of the floor assembly to provide enhanced strength for the floor assembly.

24. The vehicle of claim 17, wherein the floor assembly comprises a plurality of panels coupled together and at least one member coupled to and extending between the plurality of panels to provide enhanced strength for the floor assembly.

25. The vehicle of claim 17, wherein the plurality of frame members are formed from a reinforced polymeric material that includes fibers surrounded by a polymer matrix.

26. The vehicle of claim 17, further comprising a plurality of panels coupled to the frame to enclose the frame, the plurality of panels comprising a polymeric material.

\* \* \* \* \*